(12) United States Patent
Hwang et al.

(10) Patent No.: US 10,906,558 B1
(45) Date of Patent: Feb. 2, 2021

(54) METHODS AND SYSTEMS FOR MANAGING INTERACTIONS OF AN AUTONOMOUS VEHICLE WITH OTHER OBJECTS

(71) Applicant: IKE ROBOTICS, INC., San Francisco, CA (US)

(72) Inventors: Victor Chung Hwang, San Francisco, CA (US); Jur Van Den Berg, San Francisco, CA (US)

(73) Assignee: IKE ROBOTICS, INC., San Francisco, CA (US)

( * ) Notice: Subject to any disclaimer, the term of this patent is extended or adjusted under 35 U.S.C. 154(b) by 0 days.

(21) Appl. No.: 16/905,809

(22) Filed: Jun. 18, 2020

(51) Int. Cl.
*B60W 60/00* (2020.01)
*G06K 9/00* (2006.01)

(52) U.S. Cl.
CPC .. *B60W 60/00274* (2020.02); *B60W 60/0016* (2020.02); *G06K 9/00805* (2013.01); *B60W 2554/20* (2020.02); *B60W 2554/402* (2020.02)

(58) Field of Classification Search
CPC ........ B60W 60/0074; B60W 60/0016; B60W 2554/20; B60W 2554/402; G06K 9/00805
USPC ........................................................ 701/23
See application file for complete search history.

(56) References Cited

U.S. PATENT DOCUMENTS

| | | | |
|---|---|---|---|
| 7,711,485 B2 * | 5/2010 | Matsumoto ............ | G01C 21/26 701/301 |
| 8,788,134 B1 | 7/2014 | Litkouhi et al. | |
| 10,019,011 B1 * | 7/2018 | Green ............. | B60W 30/18109 |
| 10,733,463 B1 * | 8/2020 | Jain ....................... | G05D 1/0219 |
| 2019/0369626 A1 * | 12/2019 | Lui ....................... | G05D 1/0219 |
| 2020/0210777 A1 * | 7/2020 | Valois ............... | B60W 60/0025 |

OTHER PUBLICATIONS

Altexsoft Inc, "How to Solve Vehicle Routing Problems: Route Optimization Software and Their APIs", Medium, retrieved from the Internet: https://medium.com/@AltexSoft/how-to-solve-vehicle-routing-problems-route-optimization-software-and-their-apis-ede6fe8fa86b, Oct. 31, 2019, 14 pages.
Chen, Bill, "Autonomous Vehicle Routing at rideOS", Medium, rideOS Engineering, retrieved from the Internet: https://medium.com/rideos/autonomous-vehicle-routing-at-rideos-a0f7306b283e, Oct. 3, 2018, 6 pages.

(Continued)

*Primary Examiner* — Tan Q Nguyen
(74) *Attorney, Agent, or Firm* — Nicholson De Vos Webster & Elliott LLP

(57) ABSTRACT

A method and a system for managing interactions of an autonomous vehicle with one or more objects are described. In one embodiment, objects that are in the vicinity of the autonomous vehicle are detected based on sensor measurements. An interaction label is determined for each one of the objects. The interaction label is one of a yield label, a no-yield label, a stay-behind label, a stay in-front label, and an irrelevant label and describes an interaction of the autonomous vehicle with the object. A cost function is generated for the object based on the interaction label. A trajectory for an interval of time is determined for the autonomous vehicle based on the cost functions of one or more objects. The trajectory is then used to generate control commands for controlling the motion of the autonomous vehicle during the interval of time.

30 Claims, 15 Drawing Sheets

(56) References Cited

OTHER PUBLICATIONS

Dong, Chiyu, et al., "Interactive Ramp Merging Planning in Autonomous Driving: Multi-Merging Leading PGM (MML-PGM)", 2017 IEEE 20th International Conference on Intelligent Transportation Systems (ITSC), Oct. 2017, 6 pages.
Paden, Brian, et al., "A Survey of Motion Planning and Control Techniques for Self-driving Urban Vehicles", IEEE Transactions on Intelligent Vehicles, vol. 1, No. 1, 2016, 27 pages.
Wei, Junqing, et al., "Autonomous Vehicle Social Behavior for Highway Entrance Ramp Management", 2013 IEEE Intelligent Vehicles Symposium (IV), 2013, pp. 201-207.

* cited by examiner

| OBJECT | INTERACTION LABEL |
|--------|-------------------|
| 204A | YIELD |
| 204B | STAY-BEHIND |
| 204C | IRRELEVANT |
| 204D | IRRELEVANT |
| 204E | STAY-IN-FRONT |

Fig. 1B

```
if (trajectory_label == non-infringing) { interaction_label = IRRELEVANT;
} else if (space_label== MERGING && race_result_label == WINNER) { interaction_label = YIELD;
} else if (race_result_label == WINNER) { interaction_label = STAY_BEHIND;

} else if (space_label == MERGING && race_result_label == LOSER) { interaction_label = NO_YIELD;

}
else { interaction_label; = IRRELEVANT;
}
```

Fig. 1F

ASSIGN TO THE OBJECT, BASED ON THE TOPOLOGY OF THE ROAD ON WHICH THE OBJECT IS LOCATED AND THE ROUTE OF THE AUTONOMOUS VEHICLE, THE SPACE LABEL
314

↓

ASSIGN TO THE OBJECT, BASED ON THE PREDICTED TRAJECTORY OF THE OBJECT AND THE DESIRED FUTURE SPATIAL OCCUPANCY OF THE AUTONOMOUS VEHICLE, THE TRAJECTORY LABEL
316

↓

ASSIGN TO THE OBJECT, BASED ON A MOTION VECTOR OF THE OBJECT AND A MOTION VECTOR OF THE AUTONOMOUS VEHICLE, THE RACE RESULT LABEL
318

↓

ASSIGN TO THE OBJECT THE INTERACTION LABEL BASED ON THE SPACE LABEL, THE TRAJECTORY LABEL, AND THE RACE RESULT LABEL
305

Fig. 3B

METHODS AND SYSTEMS FOR MANAGING INTERACTIONS OF AN AUTONOMOUS VEHICLE WITH OTHER OBJECTS

TECHNICAL FIELD

Embodiments of the invention relate to the field of autonomous vehicles; and more specifically, to the management of interactions of an autonomous vehicle with other objects.

BACKGROUND ART

Autonomous vehicles are a maturing technology with the potential to reshape mobility by enhancing the safety, accessibility, efficiency, and convenience of automotive transportation. Multiple critical tasks need to be executed by a self-driving vehicle to ensure a safe motion of the vehicle in its environment. These critical tasks include motion planning for the vehicle through a dynamic environment shared with other objects (such as vehicles, pedestrians, buildings, etc.).

BRIEF DESCRIPTION OF THE DRAWINGS

The invention may best be understood by referring to the following description and accompanying drawings that are used to illustrate embodiments of the invention. In the drawings:

FIG. 1B illustrates a block diagram of exemplary interaction labels assigned to objects that are in the vicinity of the vehicle, in accordance with some embodiments.

FIG. 1F illustrates a block diagram of operations that can be used for determination of an interaction label for an object based on the space label, the trajectory label, and the race result label, in accordance with some embodiments.

FIG. 3B illustrates a flow diagram of exemplary operations that can be performed for determining an interaction label, according to some embodiments.

DETAILED DESCRIPTION

Figure 1A:
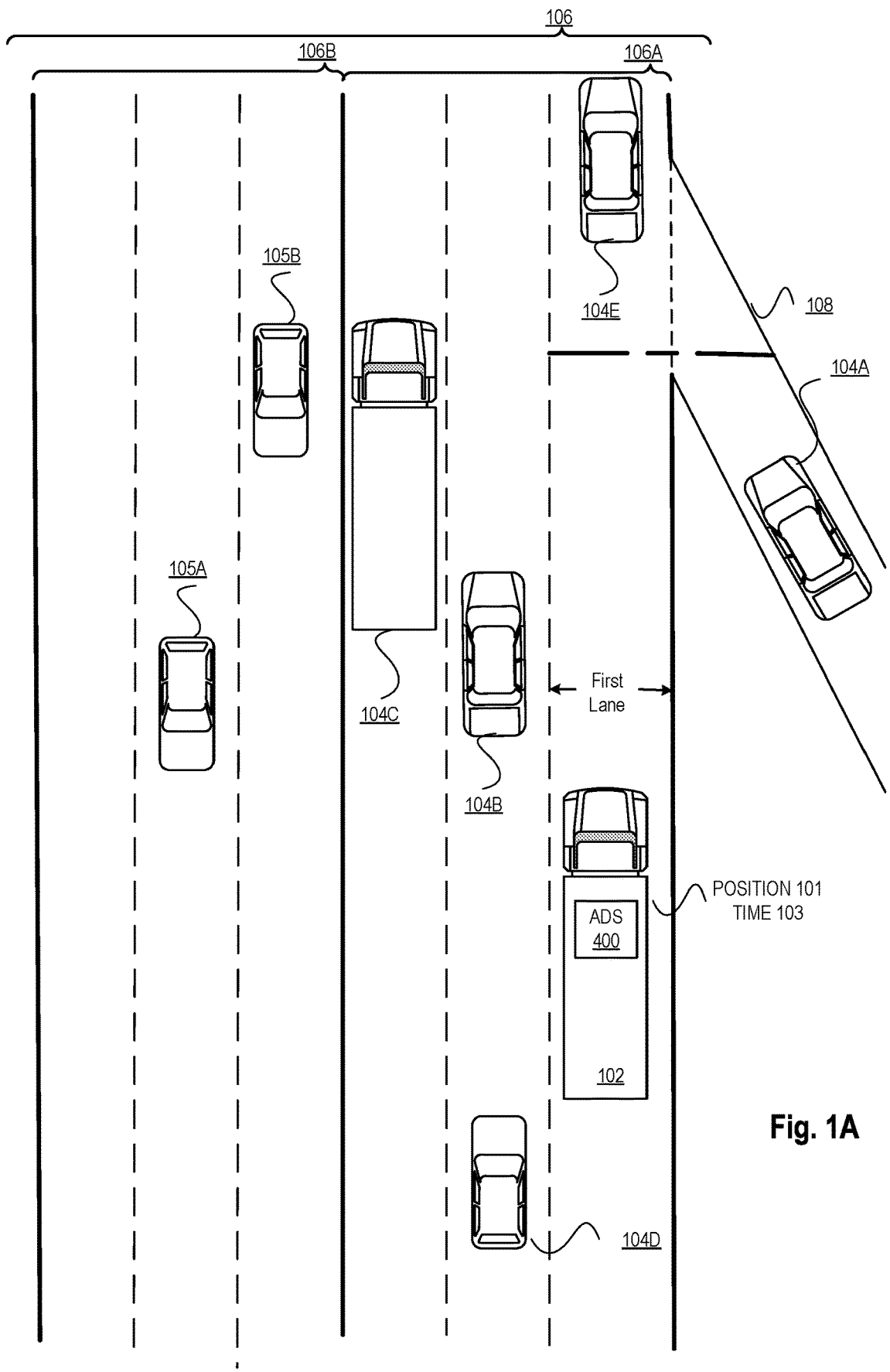
FIG. 1A illustrates an exemplary environment in which the mechanisms of managing interactions between an autonomous vehicle and objects can be performed, according to some embodiments.

The following description describes methods and apparatus for management of interactions between an autonomous vehicle and one or more objects. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate-level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and a system for managing interactions of an autonomous vehicle with one or more objects are described. In one embodiment, one or more objects that are in the vicinity of the autonomous vehicle are detected based on sensor measurements. An interaction label is determined for each one of the objects. The interaction label is one of a yield label, a no-yield label, a stay-behind label, a stay in-front, and an irrelevant label and describes an interaction of the autonomous vehicle with the object. The interaction labels affect the computation of a cost function such that the cost function is generated for the object based on the interaction label. A trajectory for an interval of time is determined for the autonomous vehicle based on the cost function. The trajectory is then used to generate control commands for controlling the motion of the autonomous vehicle during the interval of time.

In the following description the embodiments of FIGS. 2A-B and FIGS. 3A-5 will be described with reference to the exemplary environment and vehicle of the block diagrams of FIGS. 1A-G. However, the illustrated environment, vehicle, objects, and path along which the vehicle moves are intended to be exemplary only. One of ordinary skill in the art would understand that a vehicle may move in a different environment, the vehicle can be different (e.g., a car instead of a truck), the type and number of objects can be different, and the path along which the vehicle moves can be different.

FIG. 1A illustrates an exemplary environment in which the mechanisms of managing interactions between an autonomous vehicle and objects can be performed, according to some embodiments. The exemplary environment 100 includes a vehicle 102 and multiple objects that are in the vicinity of the vehicle 102 while the vehicle 102 is moving on a highway 106. The objects include the vehicles 104A-E. At time 103, the vehicle 102 is in motion on a highway towards a destination. The vehicle 102 follows a route to reach the destination. While in some scenarios, the highway 106 may include two sections 106A and 106B, in which vehicles move in two opposing directions (e.g., vehicles (e.g., vehicles 104A-E and vehicle 102) moving in a first direction in section 106A and vehicles (e.g., vehicles 105A-B) moving in a second direction that is opposite to the first direction in section 106B), in other scenarios, the highway 106 includes only a single section (e.g., section 106A) where the vehicles move in the same direction. While in some scenarios the vehicle 102 can be located in a portion 106A of the highway that includes an exit 108, in other scenarios, the vehicle is located in a portion of the highway that does not include an exit. When there is an exit, in some scenarios the vehicle 104A may be present when the vehicle 102 is approaching the exit, while in other scenarios, the vehicle 104A is not present. The embodiments described in further detail below will consider the vehicles 104A-E and the vehicles 105A-B and the presence of the exit 108 as part of the portion of the highway in which the vehicle 102 is located. While FIG. 1A illustrates a scenario with these vehicles and the exit, one of ordinary skill in the art would understand that in other scenarios more or less vehicles and objects (different from a vehicle) can be located within the vicinity of the vehicle at any given time and the portion 106A of the highway and/or highway 106 may have a different number of lanes, a different shape, one or more exits, etc., without departing from the scope of the present embodiments. The mechanisms described herein of managing interactions between the autonomous vehicle 102 and the objects that are located in the vicinity of the vehicle apply to any type of scenarios and any shape/form of the route on which the vehicle is moving.

The vehicle 102 can be any type of motor vehicle that transports people or cargo. For example, the vehicle can be a car, a truck, or a bus, etc. In some embodiments, the vehicle 102 is a truck that is operative to be coupled with a trailer. The position of the vehicle 102 is defined as a position of a reference point on the vehicle. While in some embodiments, the reference point is a center of a rear-drive axle of the vehicle, in other embodiments, any other point on the vehicle can be selected as the reference point. In some embodiments, the vehicle 102 is a self-driving vehicle, which is also known as an autonomous vehicle (AV), a connected and autonomous vehicle (CAV), a driverless car/truck, a robo-car/truck, or a robotic vehicle. In some embodiments, the vehicle 102 is a fully automated vehicle, where the vehicle is operative to move without any assistance or intervention of a driver. Alternatively, the vehicle 102 can be a semi-autonomous vehicle, which can also be referred to as an assisted-driving vehicle, where the operation of the vehicle relies on some degree of automation, while still having a driver in charge of the vehicle. The vehicle 102 includes an autonomous driving system (ADS) (e.g., ADS 400) that is operative to perform autonomous driving tasks for the vehicle. In some embodiments, the ADS 400 of the vehicle 102 is operative to manage interactions of the vehicle 102 with one or more objects, e.g., the objects 104A-E. The operations of the ADS 400 are described in further details with reference to FIGS. 2A-B, FIGS. 3A-E and FIG. 4. While the ADS 400 is illustrated as being located on the back portion of the vehicle (trailer section), this is for illustration purposes only, the location of the ADS 400 may vary and is typically located in the front of the vehicle. For example, the ADS 400 can be located in the cabin (or cab) of the vehicle when the vehicle is a tractor.

Figure 2A:
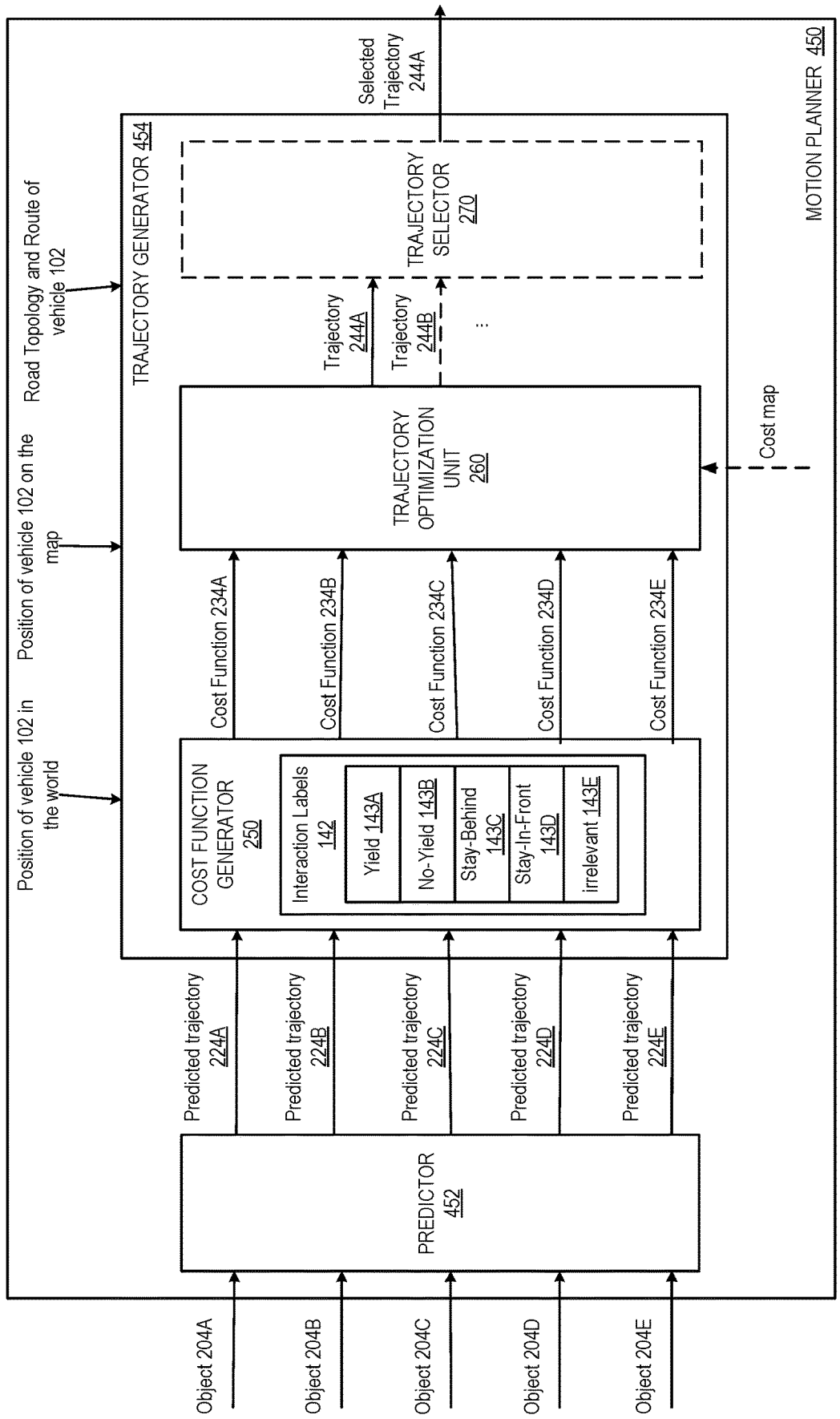
FIG. 2A illustrates a block diagram of an exemplary motion planner that can be used in some embodiments.

FIG. 2A illustrates a block diagram of an exemplary motion planner that can be used in some embodiments. In some embodiments, the ADS 400 includes a motion planner 450. The motion planner 450 is operative to receive inputs related to the position and the destination of the vehicle, and the position and motion of a set of one or more objects. In some embodiments, the motion planner 450 may also receive speed, acceleration, orientation, size of the autonomous vehicle and/or of the objects. The objects are detected based on sensor measurements of perception systems coupled with the ADS 400. The perception systems include one or more multiple sensors, such as one or more cameras, one or more lidar devices, and/or one or more radar devices, that are mounted on the autonomous vehicle. The sensor measurements are analyzed to identify the objects that are located in the vicinity of the vehicle 102. The motion planner 450 is further operative to determine and output a trajectory that the vehicle 102 is to follow during an interval of time. In some embodiments, the inputs related to the position and the destination of the vehicle include the position of the vehicle 102 in the world, the position of the vehicle on a map, a road topology, and a route for the vehicle 102. The route for the vehicle 102 may include a start position and a destination position. The road topology includes a topology of several roads that can lead from the start position to the destination. The trajectory defines the movement of the vehicle in the interval of time and is to be translated into control commands that can be executed by different actuators of the vehicle 102. The control commands are used to adjust the steering, gas, and brakes of the vehicle 102.

The motion planner 450 includes a predictor 452 and a trajectory generator 454. The predictor 452 is operative to receive a representation of the objects that are in the vicinity of the vehicle 102. For example, the predictor 452 receives object 204A, which is a representation of the vehicle 104A; object 204B, which is a representation of the vehicle 104B, object 204C, which is a representation of the vehicle 104C; object 204D, which is a representation of the vehicle 104D; and object 204E, which is a representation of the vehicle 104E. In some embodiments, each one of the objects 204A-E includes one or more parameter values that define the respective vehicle 104A-E and/or a movement of the vehicle at a given time. The parameters may include a position of the vehicle at a given time, a motion vector representing the motion of the vehicle at that position, where the motion vector may be defined based on a speed, acceleration, and direction of movement of the vehicle. The objects 204A-E represent the vehicles 104A-E that are located in the vicinity of the vehicle 102 at a given time. In some embodiments, the vicinity of the vehicle is defined as a space that includes a union of all the lanes on the section of the highway in which the vehicle is moving (e.g., all the lanes of section 106A), the shoulder of that section of the highway, and any neighboring regions intersected with the field of view of the multiple sensors of the vehicle. While in some embodiments, the space that is considered for detection of the objects can include the lane from the section 106B of the highway that is adjacent to section 106A, in other embodiments, this lane is not included. The sensors include one or more cameras, lidar devices, and radars that are mounted on the vehicle 102, where each one of these sensors is associated with a field of view. The field of views of all of these sensors when intersected with the section of the highway 106A (which includes the lanes, the shoulder, and any other region of the highway on which vehicles can move in the same direction as the vehicle 102) and a neighboring region (such as one or more lanes of the adjacent section of the highway) define the vicinity of the vehicle 102 that need to be considered for detecting objects. In the embodiments where the vicinity of the object does not include the lane from the section 106B of the highway that is adjacent to section 106A, while the vehicles 105A and 105B may be in a field of view of one or more sensors of the vehicle 102, these vehicles are not represented by an object that needs to be considered when determining the trajectory of the vehicle 102 for the interval of time. In other embodiments, when the vicinity of vehicle 102 further includes the lane from section 106B adjacent to section 106A, vehicle 105B is an object that is considered in the determination of the trajectory and vehicle 105A is an object that is not considered in the determination of the trajectory. While the illustrated examples show objects that are vehicles, in other embodiments, the object to be considered can be other than vehicles (e.g., a fence, a sign indicating closure of a lane, a building, a train track, etc.).

The predictor 452 determines one or more predicted trajectories 224A-E for each one of the input objects 204A-E. Each one of predicted trajectories 224A-E is an estimation of the trajectory of a respective one of the objects 204A-E for the interval time for which a trajectory of the vehicle is to be determined. The predicted trajectory of each object is determined based on the current position of the object and the motion vector associated with the object. The predictor 452 is coupled with the trajectory generator 454 and the output of the predictor 452, i.e., the predicted trajectories 224A-E are fed to the trajectory generator 454.

The trajectory generator 454 is operative to generate the trajectory for the vehicle based on the destination of the vehicle, the position of the vehicle in the world and on the map, the topology of the roads available, and predicted objects. The trajectory generator 454 is operative to receive a position of the vehicle 102 in the world, a position of the vehicle 102 on the map, a road topology, a route of the vehicle 102, and one or more predicted trajectories of the objects 204A-204D. Based on these inputs the trajectory generator 454 outputs a trajectory for the vehicle for an interval of time in the future. The interval of time is the length of the period during which the future movement of the vehicle is defined by the trajectory. In other words, the trajectory defines the multiple positions that the vehicle is to take in the next interval of time. In some embodiments, the interval of time for which the trajectory is generated can vary from few milli-seconds to few seconds. In one non-limiting example, the trajectory is generated for an interval of time of 12 seconds (e.g., the next 12 sec that follows the current time at which the trajectory is determined). In other examples, the trajectory can be generated for other lengths of the interval of time (e.g., 5 seconds, 10 seconds, 15 seconds, 30 seconds, 1 minutes, etc.) or a range of interval of times between 5 ms to 30 ms, without departing from the scope of the present embodiments such that at different iteration of the trajectory determination a different interval of time is considered. In some embodiments, the determination of the trajectory is repeatedly performed by the trajectory generator 454 at a given frequency. Typically, the frequency of trajectory determination is different from the length of the interval of time for which the trajectory is determined. For example, the time between two trajectory determination occurrences is typically less than the interval of time. In a non-limiting example, the frequency of trajectory determination can be in the milliseconds (e.g., every 100 ms, every 50 ms, every 200 ms, etc.) while the interval of time for the trajectory is in the seconds (e.g., 5 seconds, 10 seconds, 12 seconds, 15 seconds, 30 seconds, 1 minutes, etc.).

The trajectory generator 454 includes a cost function generator 250, a trajectory optimization unit 260, and an optional trajectory selector 270. The cost function generator 250 is operative to receive one or more predicted trajectories 224A-E for the objects 204A-E and output for each one of the objects 204A-E an associated cost function 234A-E. Each one of the cost functions 234A-E of an object associates a cost to a future position of the vehicle 102 with respect to the object. Each one of the cost functions is determined based at least in part on an interaction label determined for the object. The interaction label is one of the interactions labels 142. The interaction label associated with an object can be one of a yield label 143A, a no-yield label 143B, a stay-behind label 143C, a stay-in-front label 143D, and an irrelevant label 143E. Each object is considered a potential obstacle in time and space and the interaction label associated with the object defines the interaction that the vehicle 102 needs to have with this obstacle. The use of the interaction labels allows the determination of varying cost functions for the objects (with varying shapes and values) that need to be considered during a trajectory optimization mechanism. For example, FIG. 1B illustrates a block diagram of exemplary interaction labels assigned to objects that are in the vicinity of the vehicle, in accordance with some embodiments. Object 204A is assigned a yield label, object 204B is assigned a stay behind label, object 204C is assigned an irrelevant label, object 204D is assigned an irrelevant label, object 204E is assigned a stay-in-front label.

The trajectory generator 454 further includes a trajectory optimization unit 260. The trajectory optimization unit 260 receives the cost functions 234A-E as inputs and uses these inputs in addition to constraints in an optimization mechanism for determining one or more trajectories for the vehicle 102. The cost function is a spatio-temporal function that associates costs for moving from a position to another position with respect to the object to which the cost function is associated. This cost function associated with each object is used in the optimization mechanism for determination of the trajectory in addition to constraints that need to be satisfied by the vehicle. The trajectory optimization unit 260 determines one or more optimal trajectories that satisfy the constraint of staying in the middle of a lane (which may be the current lane or another lane of the highway—in which case a change of lane needs to be performed) while avoiding the obstacles/objects on the road. For example, when the vehicle 102 is at the position 101 at time 103, the trajectory optimization unit 260 determines a trajectory for the next 12 seconds that follow the time 103 with the objective of staying in the lane in which the vehicle is while moving towards the destination of the vehicle. While staying in the middle of a lane is provided as an example of a constraint that needs to be satisfied by the trajectory of the vehicle and therefore as a constraint used during the optimization mechanism for determination of a trajectory for the vehicle, several additional constraints can be taken into consideration for optimization of the trajectory. In some embodiments, the optimization mechanism may further consider a cost map. In some embodiments, the trajectory optimization unit 260 implements a nonlinear programming (NLP) process to solve the problem of finding the trajectories that minimize a total cost function for a trajectory based on the costs functions associated with the objects and the constraints that the vehicle's trajectory needs to adhere to. In one example, the determination of the trajectories includes minimizing a cost function for the trajectory based on the cost functions 234A-E, and the constraint that the vehicle remains in the middle of the lane while moving towards the destination of vehicle 102. Several mechanisms can be used to perform the determination of the trajectories without departing from the scope of the present embodiments.

In some embodiments, the trajectory generator 454 is operative to generate a single trajectory 244A that the vehicle needs to take in the interval of time. In other embodiments, the trajectory generator 454 is operative to generate multiple possible trajectories 244A-N that the vehicle can take in the interval of time and a decision is made in the trajectory selector 270. The trajectory selector 270 selects a single trajectory (e.g., trajectory 244A) to be used by the vehicle in the next interval of time. The selection of the trajectory from the multiple trajectories can be performed through multiple mechanisms and according to different selection criteria. In some embodiments, the selection of the trajectory can be performed by ranking the trajectories and selecting the top-ranked trajectory. For example, a series of comparisons between the trajectories are performed resulting in the ranking or ordering of these trajectories with respect to one another. In some embodiments, a trajectory that causes the vehicle to stay in the same lane (stay-in-lane trajectory) is preferred to a trajectory that causes the vehicle to change lane and get too close to another vehicle (a lane change trajectory); and a trajectory is preferred to another trajectory if it brings the vehicle closer to the goal (which may cause the selection of a lane change trajectory over a stay-in-lane trajectory, assuming the lane change is safe).

Figure 2B:
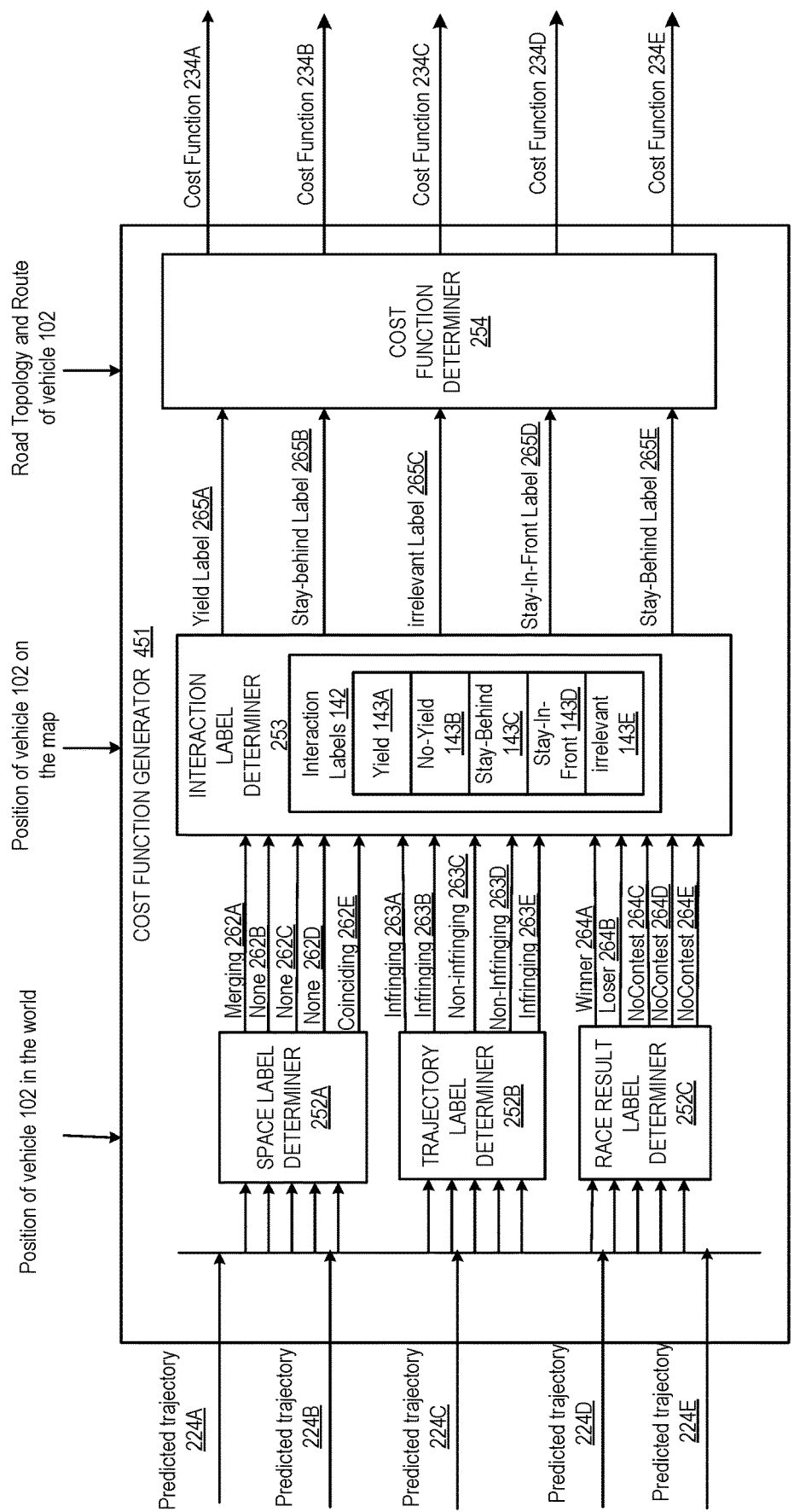
FIG. 2B illustrates a block diagram of an exemplary cost function generator 451 that can be used in some embodiments.

FIG. 2B illustrates a block diagram of an exemplary cost function generator 451 that can be used in some embodiments. The cost function generator 451 includes a space label determiner 252A, a trajectory label determiner 252B, a race result label determiner 252C, an interaction label determiner 253, and a cost function determiner 254. The space label determiner 252A determines a space label for each one of the objects 204A-E. The trajectory label determiner 252B determines a trajectory label for each one of the objects 204A-E. The race result determiner 252C determines a race result label for each one of the objects 204A-E. The trajectory label determiner 252B determines for each one of the objects 204A-E a respective interaction label. The interaction label determiner 253 determines for each one of the objects 204A-E an interaction label based on a space label, a trajectory label, and a race result label for the object. The interaction label for each object is used as an input into a cost function determiner 254 to determine a cost function 234A-E for each one of the detected objects 204A-E. While embodiments here describe an interaction label determined based on a combination of a space label, a trajectory label, and a race result label, in other embodiments, more or less labels can be used in combination in the determination of the interaction label.

The space label determiner 252A determines a space label for each one of the objects 204A-E. The determination of the space label for an object is performed based on the topology of the road on which the object is located and the route of the autonomous vehicle. The space label is indicative of a relationship between a route of the autonomous vehicle and a topology of a road on which the object is located. In some embodiments, the space label determiner 252A determines for each one of the objects 204A-E a space label that is one of a first space label, a second space label, and a third space label. In some embodiments, the terms "coinciding," "none," and "merging," are respectively used as the first space label, the second space label, and the third space label. While the embodiments herein use the terms "coinciding," "none," and "merging," as the first space label, the second space label, and the third space label respectively, other embodiments may use different terms that represent similar outcome from the evaluation of the relationship between a route of the autonomous vehicle 102 and the topology of the road on which the object is located. The first space label is assigned to an object when a first lane on which the autonomous vehicle 102 is located coincides with a second lane on which the object is located; the second space label is assigned to the object when the first lane and the second lane are disjoint, and the third space label is assigned when the first lane and the second lane merge. The first lane on which the autonomous vehicle 102 is located is determined based on the position of the vehicle 102 on the map and the topology of the road at time 103. The second lane on which the object is located is determined based on the position of the object and the topology of the road at time 103. For example, referring back to the example of FIG. 1A, the first lane on which the autonomous vehicle 102 is moving at time 103 coincides (overlaps, is the same as) the lane on which the vehicle 104E and the vehicle 104D are located at that time 103. Therefore, the first label (e.g., coinciding label 262E) is assigned to the object 204E, which represents the vehicle 104E. The first lane on which the autonomous vehicle 102 is moving at time 103 is disjoint (does not overlap and will not intersect in the future) from the lane on which the vehicle 104B and the vehicle 104C are located at that time 103. Therefore, the second label (e.g., none label 262B, none label 262C, and none label 262D) is assigned to each one of the object 204B, 204D and the object 204C, which respectively represent the vehicles 104B, 104D, and 104C. The first lane on which the autonomous vehicle 102 is located at time 103 is merging (will intersect in the future) with the lane on which the vehicle 104A is located at that time 103. Therefore, the third label (e.g., merging label 262A) is assigned to the object 204A which represents the vehicle 104A. The space labels 262A-E are used as inputs to the interaction label determiner 253.

The trajectory label determiner 252B determines a trajectory label for each one of the objects 204A-E. The determination of the trajectory label is performed based on a predicted trajectory of the object and the desired future spatial occupancy of the autonomous vehicle. For each one of the objects 204A-E, the trajectory label is indicative of a relationship between a predicted trajectory of the object and a desired future spatial occupancy of the autonomous vehicle. The desired future spatial occupancy of the autonomous vehicle 102 is determined based on the current position of the vehicle at time 103 and the destination of the vehicle. The desired future spatial occupancy is a representation of the space that the vehicle should occupy during the interval of time in order to reach the destination. In some embodiments, the desired spatial occupancy of the vehicle 102 is limited by the time interval for which the trajectory is generated. In other embodiments, the desired spatial occupancy of the vehicle 102 is not limited by the time interval for which the trajectory is generated, instead the desired spatial occupancy is a space that the vehicle needs to occupy in order to reach the destination. For example, with reference to FIG. 1A, the desired spatial occupancy of the vehicle 102 is the first lane. The trajectory label is assigned to the object as one of a first trajectory label or a second trajectory label. In some embodiments, the terms "infringing," and "non-infringing" are respectively used as the first trajectory label and the second trajectory label. While the embodiments herein use the terms "infringing" and "non-infringing" as the first trajectory label and the trajectory label respectively, other embodiments may use different terms that represent similar outcome from the evaluation of the relationship between the predicted trajectory the object and the desired future spatial occupancy of the autonomous vehicle. The first trajectory label is assigned to an object when the predicted trajectory of the object intersects with the desired future spatial occupancy of the autonomous vehicle; and the second trajectory label is assigned to an object when the predicted trajectory of the object does not intersect with the desired future spatial occupancy of the autonomous vehicle. While the embodiments herein describe a first and a second label (infringing, non-infringing), in other embodiments, additional labels can be output by the trajectory label determiner 252B. For example, in one embodiment, a third label can be added. The third label can be assigned to an object when the predicted trajectory of the object infringe on the lane of the vehicle 102 slightly and briefly. The use of this third label allows the system to handle objects that infringe on the vehicle's lane over a short distance or without moving too much inside the lane of the vehicle and/or for a short time. The use of this third label allows to distinguish the objects associated with the third label from the objects associated with an infringing label and from objects with a non-infringing label and causes a different behavior of the vehicle 102 with respect to these objects. In some embodiments, instead of using a third label a similar situation of an object can be captured by assigning "infringing" to the trajectory label of an object and a space label of "none."

Figure 1D:
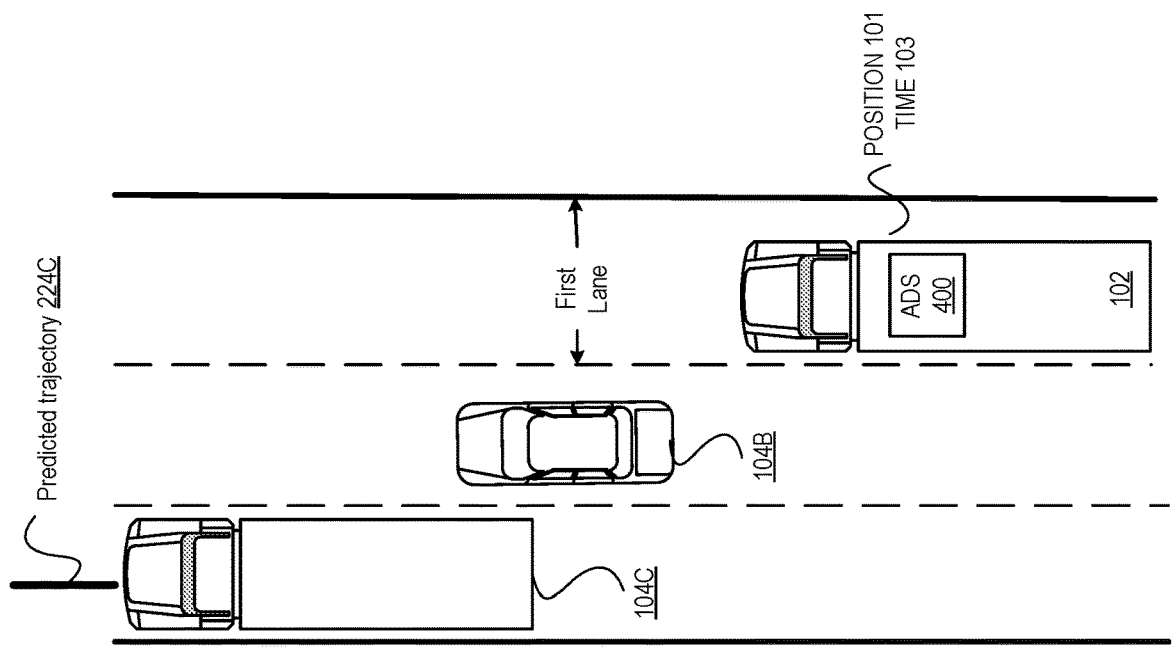
FIG. 1D illustrates a block diagram of an exemplary predicted trajectory for an object that is in the vicinity of the vehicle, in accordance with some embodiments.
Figure 1C:
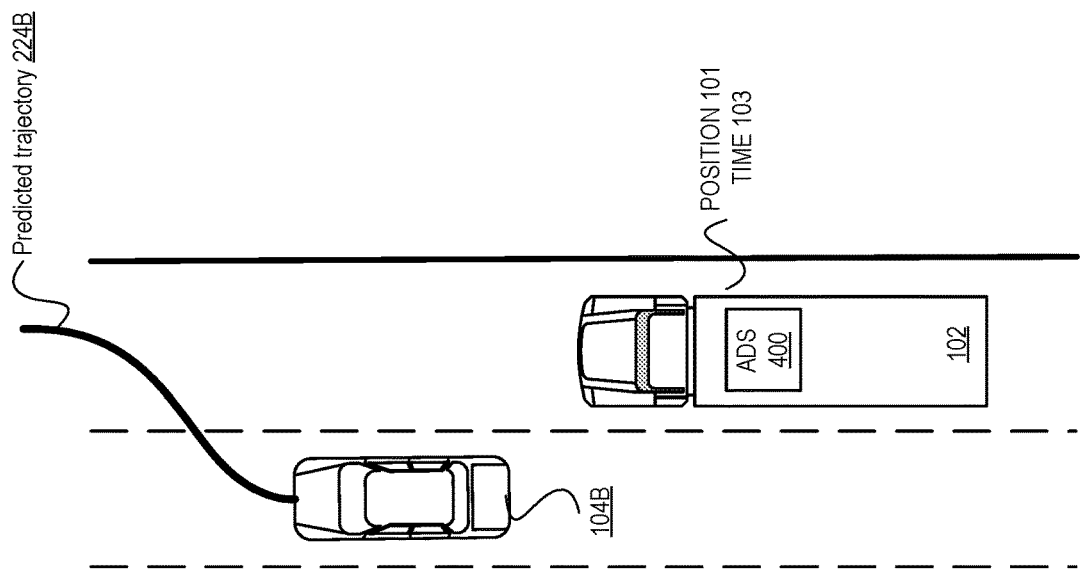
FIG. 1C illustrates a block diagram of an exemplary predicted trajectory for an object that is in the vicinity of the vehicle, in accordance with some embodiments.

FIG. 1C illustrates a block diagram of an exemplary predicted trajectory for an object that is in the vicinity of the vehicle 102, in accordance with some embodiments. The predicted trajectory 224B of the vehicle 104B is shown in FIGS. 1C and 1s expected to intersect with the desired spatial occupancy of the vehicle 102, i.e., the first lane. Thus, upon determination that the predicted trajectory 224B of the object 204B intersects with the desired future spatial occupancy of the autonomous vehicle 102, the first trajectory label (e.g., infringing label 263B) is assigned to the object 204B, which represents the vehicle 104B.

FIG. 1D illustrates a block diagram of an exemplary predicted trajectory for an object that is in the vicinity of the vehicle 102, in accordance with some embodiments. The predicted trajectory 224C of the vehicle 104C is shown in FIGS. 1D and 1s not expected to intersect with the desired spatial occupancy of the vehicle 102, i.e., the first lane. Thus, upon determination that the predicted trajectory 224C of the object 204C does not intersect with the desired future spatial occupancy of the autonomous vehicle 102, the second trajectory label (e.g., non-infringing label 263C) is assigned to the object 204C, which represents the vehicle 104C. A similar mechanism is performed by the trajectory label determiner 252B for each one of the objects 204A-E to assign a respective trajectory label resulting in the first label (infringing 263A) assigned to the object 204A, the first label (infringing 263B) assigned to the object 204B, the second label (non-infringing 263C) assigned to the object 204C, the second label (non-infringing 263D) assigned to the object 204D, and the first label (infringing 263E) assigned to the object 204E.

The race result label determiner 252C determines a race result label for each one of the objects 204A-E. The determination of the race result label for an object is performed based on a motion vector of the object and a motion vector of the autonomous vehicle. The race result label is indicative of a result of a race between the autonomous vehicle and the object. In some embodiments, the race result label determiner 252C determines whether the object and the vehicle 102 are expected to occupy the same space in the future (within the interval of time) and upon determining that the vehicle 102 and the object are expected to occupy the same space, the race result label determiner 252C determines which one of the vehicle 102 or the object are expected to reach the space first. The race result label is assigned to the object based upon which one of the vehicle 102 or the object is expected to get to that common space first. In some embodiments, the race result label determiner 252C determines for each one of the objects 204A-E a race result label that is one of a first space label, a second space label, and a third space label. In some embodiments, the terms "loser," "winner," and "no_contest," are respectively used as the first space label, the second space label, and the third space label. While the embodiments herein use the terms "loser," "winner," and "no_contest," as the first space label, the second space label, and the third space label respectively, other embodiments may use different terms that represent similar outcome from the evaluation of the relationship between a route of the autonomous vehicle 102 and the topology of the road on which the object is located. In other words, the first label is assigned to the object when the object is expected to lose the race to the common space in favor of the vehicle 102; the second label is assigned to the object when the vehicle is expected to lose the race to the common space in favor of the object 102; and the third label is assigned to the object when the vehicle and the object are not expected to reach the same location/space in the future. The determination of a race result label for an object is performed based on a motion vector of the object and a motion vector of the autonomous vehicle at a given time. In some embodiments, the motion vector of the object and/or the vehicle includes a direction of the motion of the object and/or the vehicle, a speed and acceleration of the vehicle.

Figure 1E:
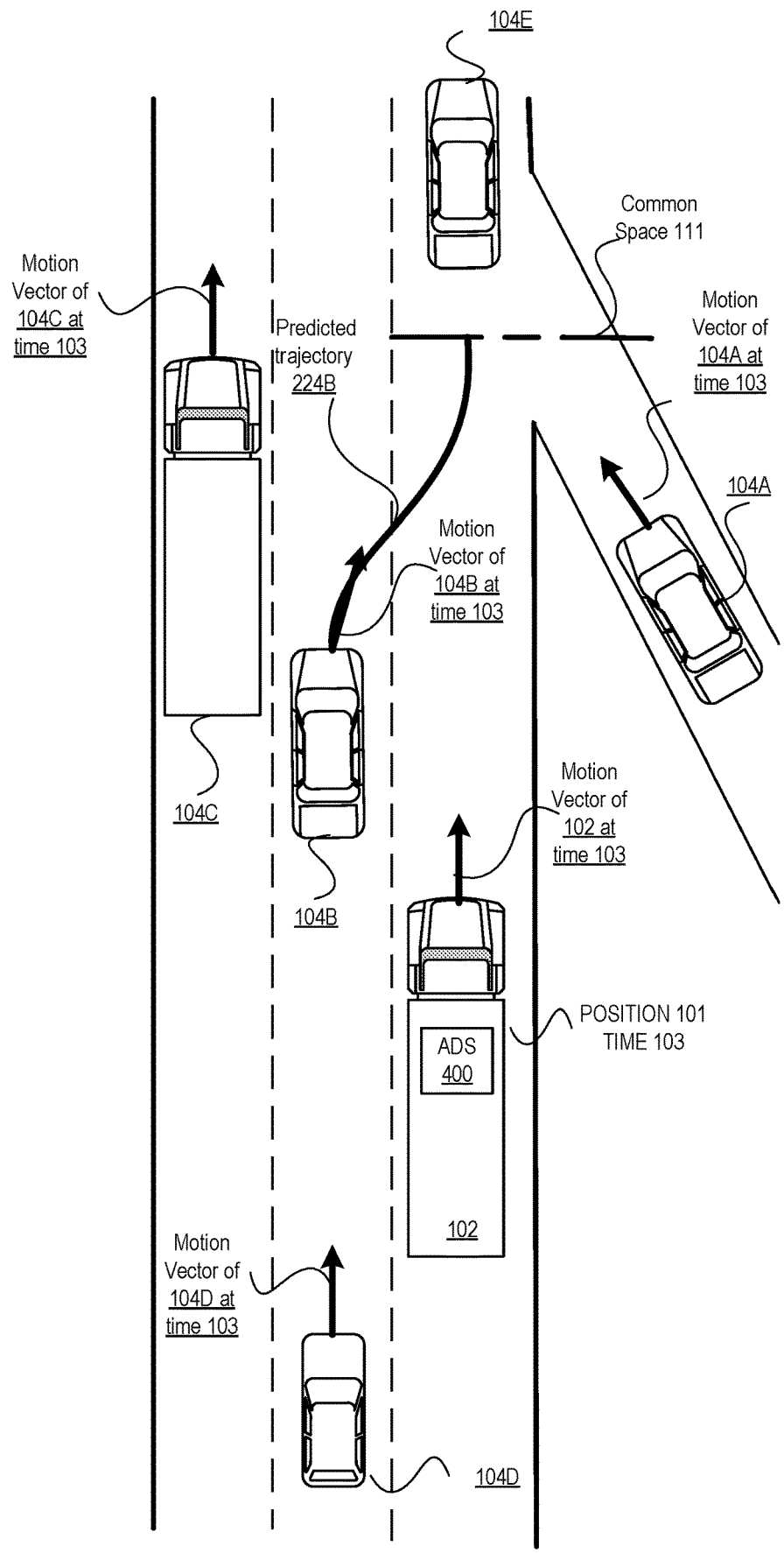
FIG. 1E illustrates a block diagram of exemplary trajectories for one or more objects and the vehicle in accordance with some embodiments.

FIG. 1E illustrates a block diagram of exemplary trajectories for one or more objects and the vehicle in accordance with some embodiments. The speed and direction of movement of the vehicle 104A, represented by the motion vector in FIG. 1E, when compared with the speed and direction of movement of the vehicle 102 indicates that the vehicle 104A is expected to reach the common space 111 before the vehicle 102. In response to determining that the vehicle 104A is to reach space 111 before the vehicle 102, the object 204A is assigned the race result label "winner" (i.e., the second race result label). The speed and direction of movement of the vehicle 104B, represented by the motion vector in FIG. 1E, when compared with the speed and direction of movement of the vehicle 102 indicates that the vehicle 102 is expected to reach the common space 111 before the vehicle 104B. In response to determining that the vehicle 102 is to reach space 111 before the vehicle 104B, the object 204B is assigned the race result label "loser" (i.e., the first race result label). The speed and direction of movement of the vehicle 104C, represented by the motion vector in FIG. 1E, when compared with the speed and direction of movement of the vehicle 102 indicates that the vehicle 104C is not expected to reach any space that the vehicle 102 is expected to reach during the interval of time. In response to determining that the vehicle 104C is not expected to reach any space that the vehicle 102 is expected to reach during the interval of time, the object 204C is assigned the race result label "no_contest" (i.e., the third race result label). In some embodiments, the race result label of "no_contest" can be derived if it is determined that the trajectory label is "not_infringing" and the space label is "none." A similar mechanism is performed by the race result label determiner 252C for each one of the objects 204A-E to assign a respective race result label resulting in the second label (winner 264A) assigned to the object 204A, the first label (loser 264B) assigned to the object 204B, the third label (no_contest 264C) assigned to the object 204C, the third label (no_contest 264D) assigned to the object 204D, and the third label (no_contest 264E) assigned to the object 204E.

While the embodiments herein are described with an object being assigned a single one of a space label, a trajectory label, and a race result label for the entire duration of the time interval for which a trajectory of the vehicle is to be determined, in other embodiments, each object is assigned multiple ones of each one of the space label, the trajectory label, and the race result label over the interval of time. For example, an object can be assigned the first space label between a first time and a second time and the second space label between the second time and the third time, when the first time, the second time and the third time are included in the interval of time. In another example, an object can be assigned the first trajectory label between a first time and a second time and the second trajectory label between the second time and the third time, when the first time, the second time and the third time are included in the interval of time.

The interaction label determiner 253 receives for each one of the objects 204A-E a corresponding set of labels, i.e., a respective one of the space labels 262A-E, a respective one of the trajectory labels 263A-E, and a respective one of the race result label 264A-E, and determines based on these labels an interaction label for the object. For example, for the object 204A, the interaction label determiner 253 receives a space label 262A (merging), a trajectory label 263A (infringing), and a race result label 264A (winner) and determines the interaction label 265A (yield). For the object 204A, the interaction label determiner 253 receives a space label 262A (merging), a trajectory label 263A (infringing), and a race result label 264A (winner) and determines the interaction label 265A (yield). For the object 204B, the interaction label determiner 253 receives a space label 262B (None), a trajectory label 263B (infringing), and a race result label 264B (loser) and determines the interaction label 265B (Stay-behind). For the object 204C, the interaction label determiner 253 receives a space label 262C (None), a trajectory label 263C (non-infringing), and a race result label 264C (no_contest) and determines the interaction label 265C (irrelevant). For the object 204D, the interaction label determiner 253 receives a space label 262D (none), a trajectory label 263D (non-infringing), and a race result label 264D (no_contest) and determines the interaction label 265D (stay-in-front). For the object 204E, the interaction label determiner 253 receives a space label 262E (Coinciding), a trajectory label 263E (infringing), and a race result label 264E (no_contest) and determines the interaction label 265E (stay-behind).

In some embodiments, the determination of the interaction label based on the space label, the trajectory label, and the race result label for an object is performed according to FIG. 1F.

FIG. 1F illustrates a block diagram of operations that can be used for determination of an interaction label for an object based on the space label, the trajectory label, and the race result label, in accordance with some embodiments. A determination of which interaction label is associated with the object is performed. When the trajectory label of an object is non-infringing (indicating that the predicted trajectory of the object does not intersect with a desired future spatial occupancy of the autonomous vehicle 102), the interaction label is set to irrelevant. This causes the determination of the trajectory for vehicle 102 to ignore or not consider the objects that will not intersect a potential trajectory of the vehicle. Alternatively, when it is determined that the trajectory label of the object is different from non-infringing (e.g., infringing, or other), a determination of which type of space label and which type of race result label are associated with the object is performed. Upon determining that the space label of the object is "merging" and the race result label of the object is "winner," the interaction label is set to "yield." As the object is determined to be merging into the lane on which vehicle 102 is located and the object is predicted to arrive at a common position in the world before the vehicle 102, the interaction label for the object is set to yield indicating that the vehicle 102 is to yield the road to the object. Alternatively, if it is determined that the race result label of the object is "winner," the interaction label of the object is set to "stay-behind." In other words, if the driving lane of the object is determined to be coinciding with the lane of vehicle 102 (i.e., it is not merging but becomes the lane of vehicle 102 instead) or if the object is determined to be in a non-merging lane but is infringing on the lane of the vehicle 102, and the object is determined to arrive earlier to a common position in the world, then the vehicle is to stay behind the object. Alternatively, when it is determined that the space label of the object is "merging" and the race result label of the object is "loser," the interaction label for the object is set to "no-yield." Alternatively, in all other scenarios, the interaction label of the object is set to "irrelevant."

Figure 1G:
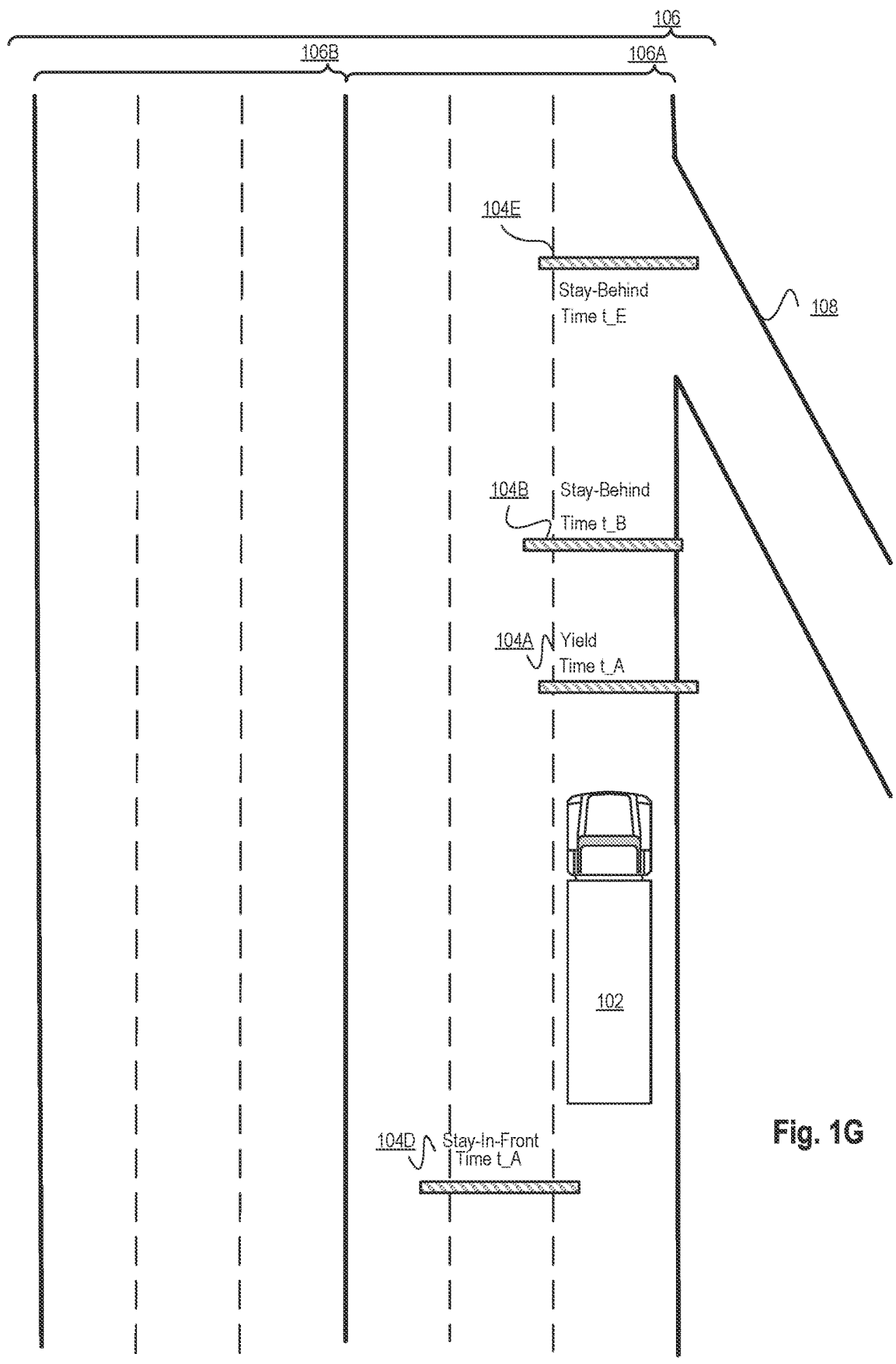
FIG. 1G illustrates a block diagram of exemplary obstacles that need to be considered and their associated labels when determining the trajectory for the vehicle during the interval of time, in accordance with some embodiments.

When a yield label is assigned to an object (e.g., object 204A), it is an indication that the object is merging into a lane in which the vehicle is located, and the vehicle is to consider the object as an obstacle for which and the vehicle 102 is to perform an appropriate merging behavior with respect to the object. In this case, the burden of avoidance is placed on the vehicle 102. Alternatively, when a no-yield is assigned to an object, it is an indication that the object is merging into the lane in which the vehicle is located but there is no need to react to the motion of the vehicle. In this case, the burden of avoidance is placed on the object instead of on the vehicle 102. When a stay-behind label assigned to an object (e.g., object 204B) implies that the object is in the lane of the vehicle 102 (or that it is expected to be in that lane in a future time within the interval of time, e.g., at time t_B for vehicle 104B) and the vehicle is to remain behind the object 204B during the interval of time. When a stay in-front label is assigned to an object (e.g., 204D) this is an indication that the trajectory to be produced for the vehicle based on this label associated with the object needs to ensure that the vehicle stays in front of the object in order to be considered a valid trajectory. In some embodiments, the assignment of the stay-in-front label to an object is an indication that the object is still to be considered when determining the trajectory of the vehicle during the interval of time and that the system is not putting the burden of avoidance solely on that object. For example, the stay-in-front label can be used for labeling objects in a lane that is adjacent to the lane in which the vehicle is when determining a trajectory for a lane change. Each one of the interaction labels induces a different behavior of the vehicle 102 and is used to determine a particular cost function 234A-E for each one of the objects 204A-E. FIG. 1G illustrates a block diagram of exemplary obstacles that need to be considered and their associated labels when determining the trajectory for the vehicle during the interval of time, in accordance with some embodiments.

In some embodiments, the determination of the interaction label is associated with a second time interval during which the label is to be associated with the object, where the second time interval is included in the time interval for which the trajectory of the vehicle 102 is to be determined. For example, a first interaction label (e.g., irrelevant) is associated with an object during an interval that spans between the time 103 (the current time) and a second time and a second interaction label (stay behind) is associated another interval between the second time and the end of the interval of time for which the trajectory of the vehicle 102 is to be determined. In a non-limiting example, when the interval of time is 12 seconds, a first interaction label (e.g., irrelevant) is assigned to an object for the first 6 seconds indicating that the object is not an obstacle that needs to be considered by the vehicle 102 and a second interaction label (e.g., stay behind) is assigned to the object for the remaining 6 seconds of the 12 seconds interval of time indicating that the object is to be considered an obstacle by the vehicle 102 and the vehicle is to remain behind the object during the remaining 6 seconds of the interval of time. In some embodiments, two or more interaction labels can be associated with the same object during the interval of time for which the trajectory of the vehicle is to be determined. In some of these embodiments, when two interaction labels are determined for an object during the interval of time, a single one of these interaction labels can be selected to be assigned to the object for the entire interval of time. For example, if the irrelevant label and the stay-behind label are determined for sub-interval of times, the stay-behind label is selected to be associated with the object for the entire interval of time for which the trajectory of the vehicle is to be determined. In other embodiments, a single interaction label is associated with an object during the interval of time.

The embodiments described herein allow an ADS 400 to handle interactions with objects that are in the vicinity of the vehicle 102 based on interaction labels. In these embodiments, the determination of the trajectory of a vehicle 102 for an interval of time is performed at least in part based on the interaction labels assigned to the objects that are in the vicinity of the vehicle. The use of different types of labels (yield, irrelevant, stay-behind, stay-in-front, and no-yield) allows the ADS to consider all objects and determine cost functions that can be used for the determination of the trajectory for the vehicle through an optimization mechanism that uses both cost functions and constraints.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different from those discussed with reference to the flow diagrams.

Figure 3A:
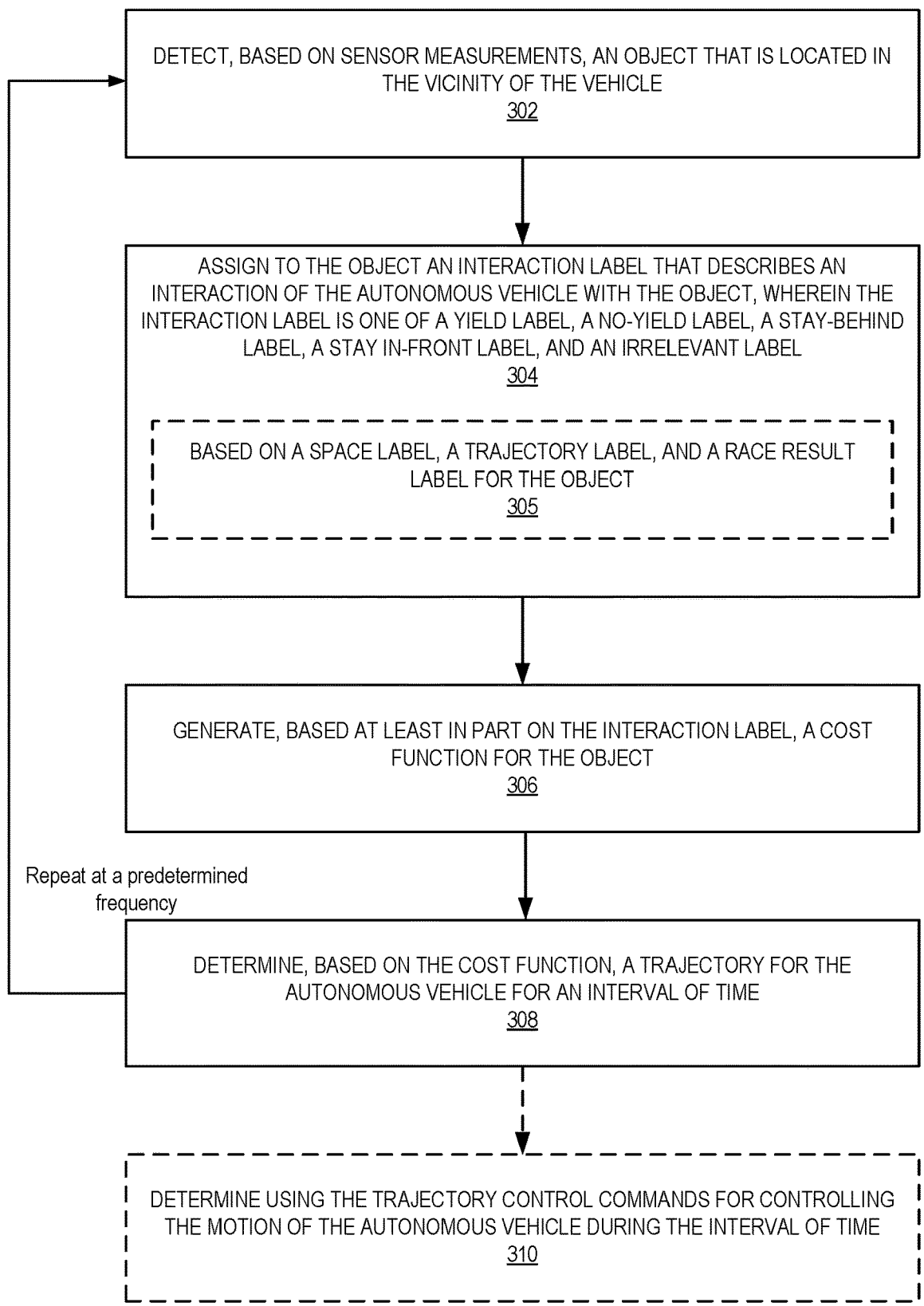
FIG. 3A illustrates a flow diagram of exemplary operations for managing interactions of an autonomous vehicle and other objects, according to some embodiments.

FIG. 3A illustrate a flow diagram of exemplary operations that can be performed for managing interaction of an autonomous vehicle with one or more objects in accordance with some embodiments. The operations described herein can be performed by an ADS 400 of an autonomous vehicle for determining a trajectory of a vehicle by managing interactions of the vehicle with one or more objects. While the flow diagrams are described with respect to an object that is located in the vicinity of the vehicle, one of ordinary skill in the art would understand that several objects can be located in the vicinity of the vehicle and the operations described herein apply to the multiple objects detected. For example, as described with reference to FIG. 1A, multiple objects 204A-E can be located in the vicinity of the vehicle 102 for which interaction with the vehicle 102 needs to be managed.

At operation 302, an object is detected in the vicinity of the autonomous vehicle based on sensor measurements. The sensor measurements are received from one or more cameras, one or more lidar devices, and/or one or more radar devices that are mounted on the autonomous vehicle. The sensor measurements are analyzed to identify one or more objects that are located in the vicinity of vehicle 102 and may need to be considered when determining a trajectory for vehicle 102. Several mechanisms can be used for detecting the object in the vicinity of the vehicle. The object detection is performed to recognize and localize multiple objects in the scene captured by the sensors (e.g., camera, lidar, radar). In some embodiments, objects can be recognized by estimating a classification probability and are localized within a bounding box. In some embodiments, deep learning approaches can be used for detecting the objects that are located in the vicinity of the vehicle.

In some embodiments, the object (e.g., each one of the objects 204A-E) includes one or more parameter values that define the respective vehicle (e.g., each one of the vehicles 104A-E) and/or a movement of the vehicle at a given time. The parameters may include a position of the vehicle at the given time, a motion vector representing the motion of the vehicle at that position, where the motion vector may be defined based on a speed, acceleration, and direction of movement of the vehicle. The object represents the vehicle that is located in the vicinity of the vehicle 102 at a given time. In some embodiments, the vicinity of the vehicle is defined as a space that includes a union of all the lanes on the section of the highway in which the vehicle is moving (e.g., all the lanes of section 106A), the shoulder of that section of the highway, and any neighboring regions intersected with the field of view of the multiple sensors of the vehicle. While in some embodiments, the space that is considered for detection of the objects can include the lane from the section 106B of the highway that is adjacent to section 106A, in other embodiments, this lane is not included. Each one of the sensors is associated with a field of view. The field of views of all of the sensors when intersected with the section of the highway 106A (which includes the lanes, the shoulder, and any other region of the highway on which vehicles can move in the same direction as the vehicle 102) and a neighboring region (such as one or more lanes of the adjacent section of the highway) define the vicinity of the vehicle 102 that needs to be considered for detecting objects.

The flow of operations moves to operation 304, at which an interaction label is determined for the object. The interaction label describes an interaction of the autonomous vehicle with the object and is one of a yield label, a no-yield label, a stay-behind label, a stay in-front, and an irrelevant label. In some embodiments, the determination of the interaction label for the object can be performed based on a space label, a trajectory label, and a race result label for the object. In some embodiments, the determination of the interaction label is performed as described with reference to FIG. 3B-E, and FIG. 2B.

The flow of operation then moves to operation 306, at which a cost function is generated for the object based at least in part on the interaction label. Each object is associated with a respective one of the cost functions 234A-E. Each one of the cost functions 234A-E of an object associates a cost to a potential future position of the vehicle 102 with respect to the object at a given time. A potential future position of the vehicle 102 is a position in the world that the vehicle may occupy if this position is selected to be part of a trajectory for the vehicle. Each one of the cost functions is determined based at least in part on an interaction label determined for the object at that time. The interaction label is one of the interaction labels 142. The interaction label associated with an object at a given time can be one of a yield label 143A, a no-yield label 143B, a stay-behind label 143C, a stay-in-front label 143D, and an irrelevant label 143E. Each object is considered a potential obstacle in time and space and the interaction label associated with the object defines the interaction that the vehicle 102 needs to have with this obstacle at a given time and location. The use of the interaction labels allows the determination of varying cost functions (with varying shapes and values) that need to be considered during a trajectory optimization mechanism for the vehicle 102. In some embodiments, multiple cost functions can be associated with a single object during the interval of time, each one of the cost functions is associated with a different interaction label at a given time. In other embodiments, the same cost function is associated with the object during the entire interval of time.

In one example, the stay-behind label causes the cost function to include high costs for potential future positions of the vehicle 102 that are closer to the object and decreasing costs for potential future positions of the vehicle that are farther from the object. Thus, the selection of the stay-behind label for an object encourages the determination of a trajectory for the vehicle 102 that gives headway to the object. In contrast to the stay-behind label, a yield label associated with an object causes the cost function for the object to include, at a similar potential future position for the vehicle, costs that are lower than the high costs determined based on the stay-behind label. In other words, the yield label causes a generation of a cost function that allows the vehicle 102 to get closer to the object than it would in the case of a stay-behind scenario.

The flow of operation moves to operation 308, at which a trajectory for the autonomous vehicle is determined for an interval of time based on the cost functions. In one embodiment, the trajectory for the vehicle is determined based on the destination of the vehicle, the position of the vehicle in the world and on the map, the topology of the roads available, and the cost functions. The interval of time is the length of the period during which the future movement of the vehicle is defined by the trajectory. In other words, the trajectory defines the multiple positions that the vehicle is to take in the next interval of time. In some embodiments, the interval of time for which the trajectory is generated can vary from few milli-seconds to few seconds. In one non-limiting example, the trajectory is generated for an interval of time of 12 seconds (e.g., the next 12 sec that follows the current time at which the trajectory is determined). In other examples, the trajectory can be generated for other lengths of the interval of time (e.g., 5 seconds, 10 seconds, 15 seconds, 30 seconds, 1 minutes, etc.) or a range of interval of times between 5 ms to 30 ms, without departing from the scope of the present embodiments such that at different iteration of the trajectory determination a different interval of time is considered. In some embodiments, the determination of the trajectory is repeatedly performed at a given frequency. Typically, the frequency of trajectory determination is different from the length of the interval of time for which the trajectory is determined. For example, the time between two trajectory determination occurrences is typically less than the interval of time. In a non-limiting example, the frequency of trajectory determination can be in the milliseconds range (e.g., every 100 ms, every 50 ms, every 200 ms, etc.) while the interval of time for the trajectory is in the seconds range (e.g., 5 seconds, 10 seconds, 12 seconds, 15 seconds, 30 seconds, 1 minutes, etc.).

The cost functions 234A-E are used in addition to constraints in an optimization mechanism for determining one or more trajectories for the vehicle 102. The cost function is a spatio-temporal function that associates costs for moving from a position to another position with respect to the object to which the cost function is associated. This cost function is used in the optimization mechanism for determination of the trajectory in addition to constraints that need to be satisfied by the vehicle. The trajectory optimization unit 260 determines one or more optimal trajectories that satisfy the constraint of staying in the middle of a lane (which may be the current lane or another lane of the highway—in which case a change of lane needs to be performed) while avoiding the obstacles on the road. For example, when the vehicle 102 is at the position 101 at time 103, the trajectory optimization unit 260 determines a trajectory for the next 12 seconds that follow the time 103 with the objective of staying in the lane in which the vehicle is while moving towards the destination of the vehicle. While staying in the middle of a lane is provided as an example of a constraint that needs to be satisfied by the trajectory of the vehicle and therefore as a constraint used during the optimization mechanism for determination of a trajectory for the vehicle, several additional constraints can be taken into consideration in the optimization mechanism. In some embodiments, the optimization mechanism may further consider a cost map in addition to the cost functions associated with the objects. In some embodiments, the trajectory optimization unit 260 implements a nonlinear programming (NLP) process to solve the problem of finding the trajectories that minimize a total cost function for the trajectory of the vehicle based on the costs functions associated with the objects while satisfying the constraints that the vehicle's trajectory needs to adhere to. In one example, the determination of the trajectories includes minimizing a cost function for the trajectory based on the cost functions 234A-E and the constraints of remaining in the middle of the lane and moving towards the destination of vehicle 102. Several mechanisms can be used to perform the determination of the trajectories without departing from the scope of the present embodiments.

In some embodiments, a single trajectory (e.g., trajectory 244A) that the vehicle needs to take in the interval of time is generated. In other embodiments, multiple possible trajectories 244A-N that the vehicle can take in the interval of time are generated and a decision is made to select a single one of these trajectories. The selection of the trajectory from the multiple trajectories can be performed through multiple mechanisms and according to different selection criteria. The flow of operations moves to operation 310, at which using the trajectory, control commands are determined for controlling the motion of the autonomous vehicle during the interval of time. The control commands can be executed by different actuators of the vehicle 102 and are used to adjust the steering, gas, and brakes of the vehicle 102.

FIG. 3B illustrates a flow diagram of exemplary operations that can be performed for determining an interaction label, according to some embodiments. At operation 314, the space label is assigned to the object based on the topology of the road on which the object is located and the route of the autonomous vehicle. In some embodiments, operation 314 can be performed as described with reference to FIG. 3C, FIG. 2B, and FIGS. 1A-G.

At operation 316, the trajectory label is assigned to the object based on the predicted trajectory of the object and the desired future spatial occupancy of the autonomous vehicle. In some embodiments, operation 316 can be performed as described with reference to FIG. 3D, FIG. 2B, and FIGS. 1A-G.

At operation 318, the race result label is assigned to the object based on a motion vector of the object and a motion vector of the autonomous vehicle. In some embodiments, operation 318 can be performed as described with reference to FIG. 3D, FIG. 2B, and FIGS. 1A-G.

Figure 3C:
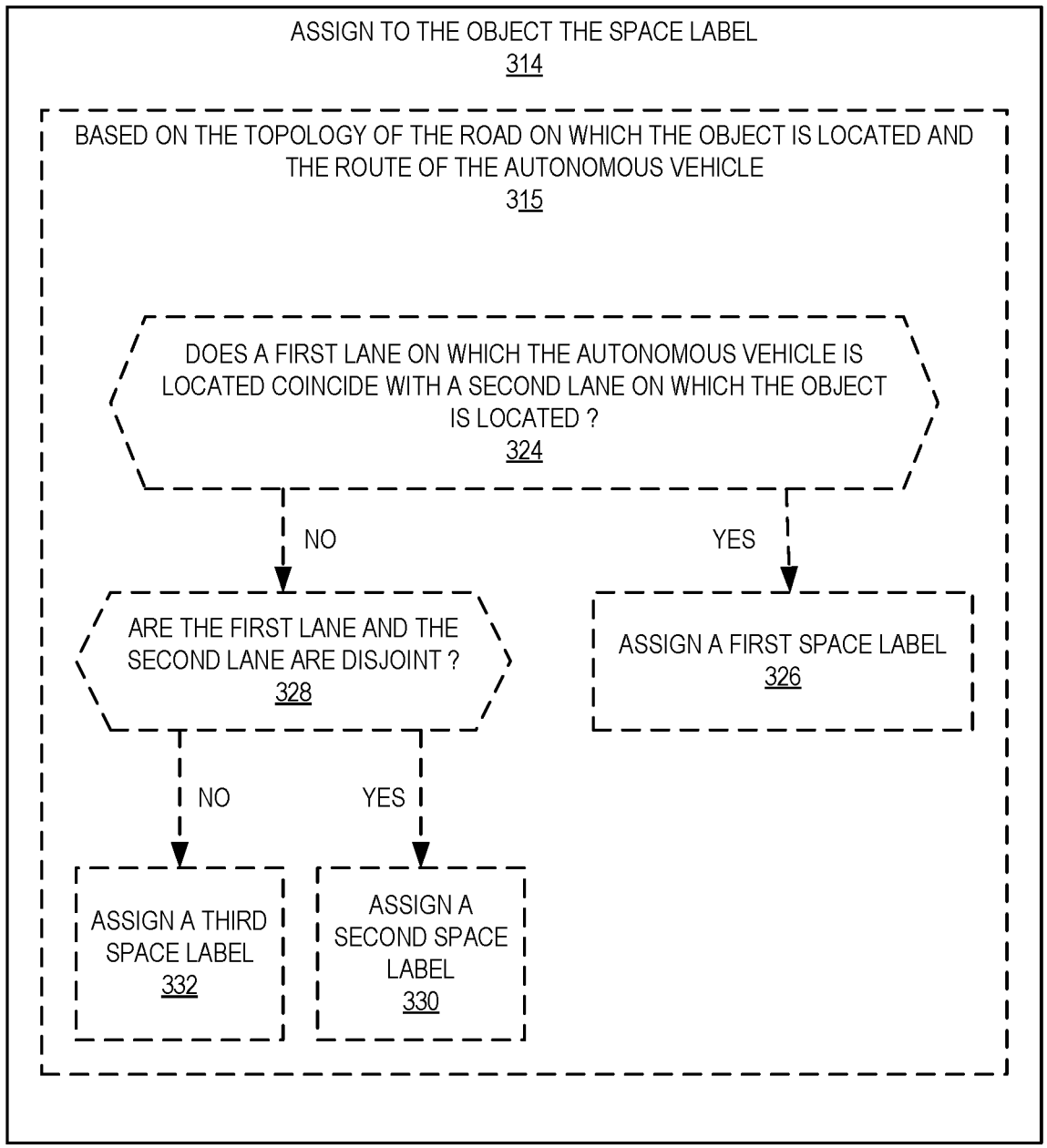
FIG. 3C illustrates a flow diagram of exemplary operations that can be performed for assigning a space label to an object in accordance with some embodiments.

FIG. 3C illustrates a flow diagram of exemplary operations that can be performed for assigning a space label to an object in accordance with some embodiments. The space label is indicative of a relationship between a route of the autonomous vehicle and a topology of a road on which the object is located. The determination of the space label for an object is performed based on the topology of the road on which the object is located and the route of the autonomous vehicle. In some embodiments, a space label is one of a first space label, a second space label, and a third space label. In some embodiments, the terms "coinciding," "none," and "merging," are respectively used as the first space label, the second space label, and the third space label. While the embodiments herein use the terms "coinciding," "none," and "merging," as the first space label, the second space label, and the third space label respectively, other embodiments may use different terms that represent similar outcome from the evaluation of the relationship between a route of the autonomous vehicle 102 and the topology of the road on which the object is located.

At operation 324, a determination of whether the first lane on which the autonomous vehicle is located coincides with the second lane on which the object is located is performed. Upon determining that the first lane on which the autonomous vehicle 102 is located coincides with a second lane on which the object is located, the flow of operations moves to operation 326. At operation 326, the first space label is assigned. The first lane on which the autonomous vehicle 102 is located is determined based on the position of the vehicle 102 on the map and the topology of the road at time 103. The second lane on which the object is located is determined based on the position of the object and the topology of the road at time 103. Upon determining that the first lane on which the autonomous vehicle 102 is located does not coincide with a second lane on which the object is located, the flow of operations moves to operation 328. At operation 328, a determination of whether the first lane and the second lane are disjoint is performed. Upon determining that the first lane and the second lane are disjoint, the flow of operations moves to operation 330. At operation 330, the second space label is assigned to the object. Upon determining that the first lane and the second lane are not disjoint (i.e., they are merging), the flow of operations moves to operation 332. At operation 332, the third space label is assigned when the first lane and the second lane merge.

Figure 3D:
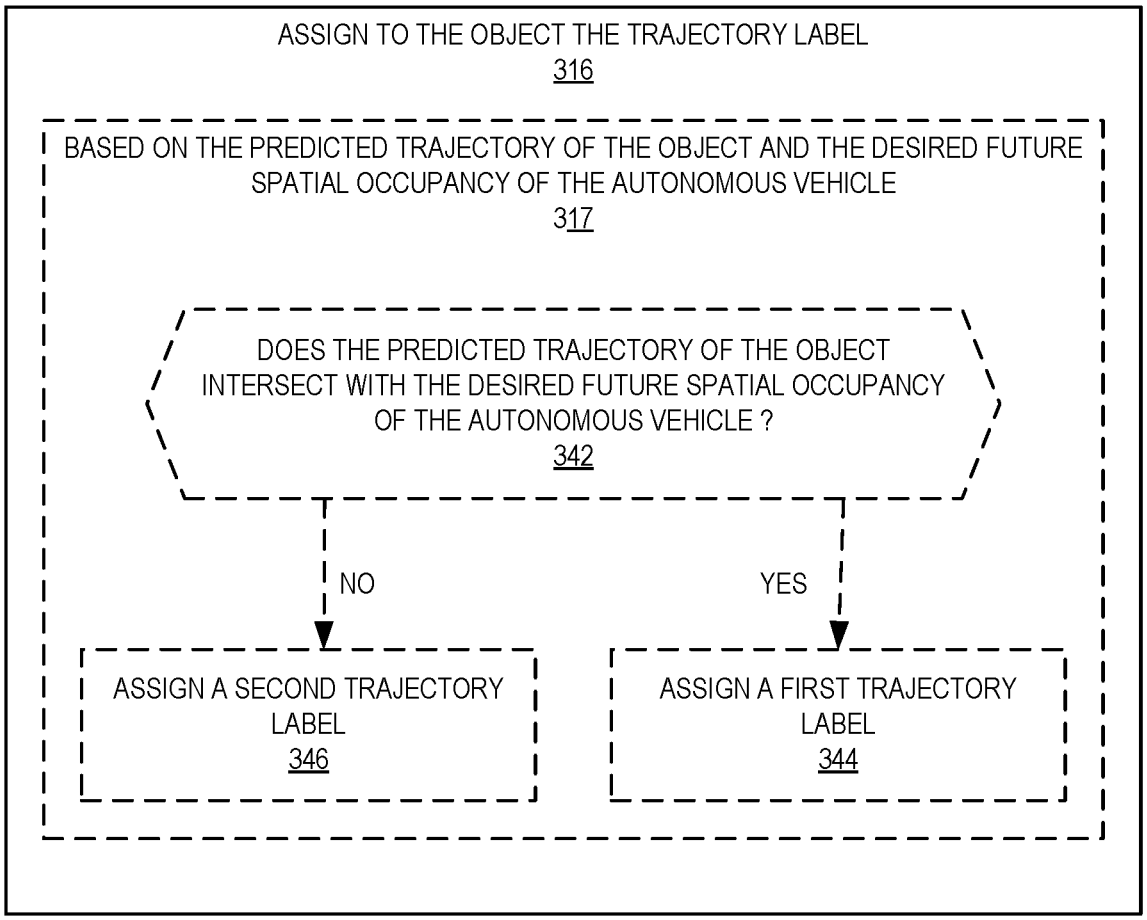
FIG. 3D illustrates a flow diagram of exemplary operations that can be performed for assigning a trajectory label to an object in accordance with some embodiments.

FIG. 3D illustrates a flow diagram of exemplary operations that can be performed for assigning a trajectory label to an object in accordance with some embodiments. The determination of the trajectory label is performed based on a predicted trajectory for the object and the desired future spatial occupancy of the autonomous vehicle. For each object, the trajectory label is indicative of a relationship between a predicted trajectory of the object and a desired future spatial occupancy of the autonomous vehicle. The desired future spatial occupancy of the autonomous vehicle 102 is determined based on the current position of the vehicle at time 103 and the destination of the vehicle. The desired future spatial occupancy is a representation of the space that the vehicle should occupy during the interval of time in order to reach the destination. In some embodiments, the desired spatial occupancy of the vehicle 102 is limited by the time interval for which the trajectory is generated. In other embodiments, the desired spatial occupancy of the vehicle 102 is not limited by the time interval for which the trajectory is generated, instead the desired spatial occupancy is a space that the vehicle needs to occupy in order to reach the destination. For example, with reference to FIG. 1A, the desired spatial occupancy of the vehicle 102 is the first lane. The trajectory label is assigned to the object as one of a first trajectory label or a second trajectory label. In some embodiments, the terms "infringing," and "non-infringing" are respectively used as the first trajectory label and the second trajectory label. While the embodiments herein use the terms "infringing" and "non-infringing" as the first trajectory label and the trajectory label respectively, other embodiments may use different terms that represent similar outcome from the evaluation of the relationship between the predicted trajectory the object and the desired future spatial occupancy of the autonomous vehicle. At operation 342, a determination of whether the predicted trajectory of the object intersects with the desired future spatial occupancy of the autonomous vehicle is performed. Upon determining that the predicted trajectory of the object intersects with the desired future spatial occupancy of the autonomous vehicle, the flow of operation moves to operation 344. At operation 344, the first trajectory label is assigned to the object. Upon determining that the predicted trajectory of the object does not intersect with the desired future spatial occupancy of the autonomous vehicle, the flow of operation moves to operation 346. At operation 344, the second trajectory label is assigned to the object.

Figure 3E:
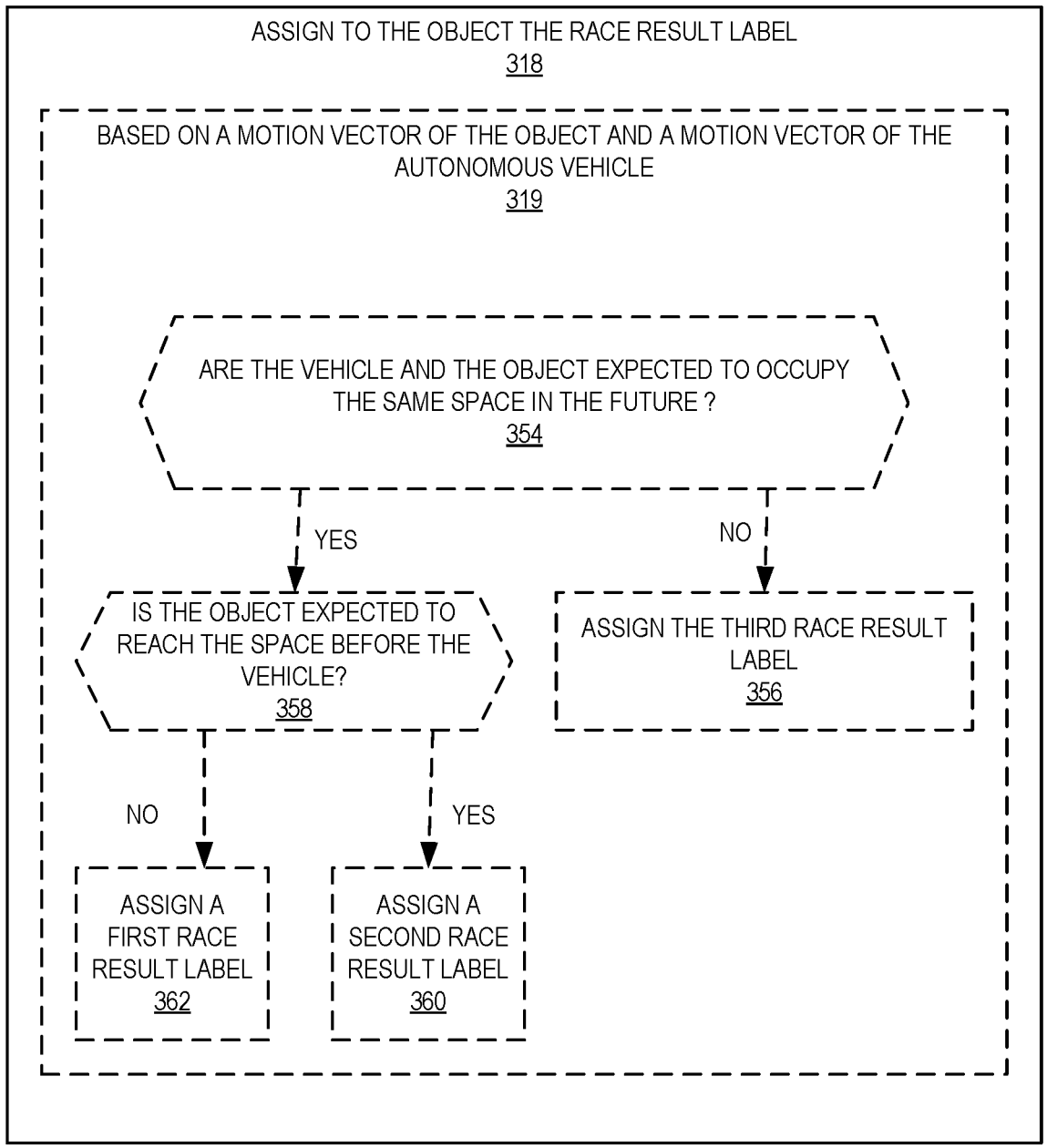
FIG. 3E illustrates a flow diagram of exemplary operations that can be performed for assigning a race result label to an object in accordance with some embodiments.

FIG. 3E illustrates a flow diagram of exemplary operations that can be performed for assigning a race result label to an object in accordance with some embodiments. The determination of the race result label for an object is performed based on a motion vector of the object and a motion vector of the autonomous vehicle. The race result label is indicative of a result of a race between the autonomous vehicle and the object. In some embodiments, the race result label determiner 252C determines for each one of the objects 204A-E a race result label that is one of a first space label, a second space label, and a third space label. In some embodiments, the terms "loser," "winner," and "no_contest," are respectively used as the first space label, the second space label, and the third space label. While the embodiments herein use the terms "loser," "winner," and "no_contest," as the first space label, the second space label, and the third space label respectively, other embodiments may use different terms that represent similar outcome from the evaluation of the relationship between a route of the autonomous vehicle 102 and the topology of the road on which the object is located. In other words, the first label is assigned to the object when the object is expected to lose the race to the common space in favor of the vehicle 102; the second label is assigned to the object when the vehicle is expected to lose the race to the common space in favor of the object 102; and the third label is assigned to the object when the vehicle and the object are not expected to reach the same location/space in the future. The determination of a race result label for an object is performed based on a motion vector of the object and a motion vector of the autonomous vehicle at a given time. In some embodiments, the motion vector of the object and/or the vehicle includes a direction of the motion of the object and/or the vehicle, a speed and acceleration of the vehicle.

At operation 354, a determination of whether the object and the vehicle 102 are expected to occupy the same space in the future (within the interval of time) is performed. Upon determining that the vehicle 102 and the object are not expected to occupy the same space, the flow of operation moves to operation 356, at which the third race result label is assigned to the object. Upon determining that the vehicle 102 and the object are expected to occupy the same space, the flow of operations moves to operation 358, at which a determination of whether the object is expected to reach the space before the vehicle is performed. Upon determining that the object is to reach the space before the vehicle, the flow of operations moves to operation 360, at which the second race result label is assigned to the object. Upon determining that the vehicle is to reach the space before the object, the flow of operations moves to operation 362, at which the first race result label is assigned to the object.

The embodiments described herein present several advantages when compared with other mechanisms of managing interactions between objects and an autonomous vehicle. The mechanisms herein cast complex multi-variable continuous signals into a discrete set of variables in an organized manner Working with the discrete set of variables (e.g., a finite set of interaction labels, which are in turn determined based on a finite set of labels (e.g., the space label, the race result label, the trajectory label)) allows to have a finer-grained control over the vehicle's behavior in specific and understandable contexts. This enables the mechanisms described herein to be less prone to errors than other autonomous driving mechanisms. The embodiments described herein are easily adaptable to updates. For example, newer labels can be defined to further distinguish between the objects and the vehicle (by adding labels to each one of the race result labels, trajectory labels, space labels, or more generally the interaction labels).

Architecture

Figure 4:
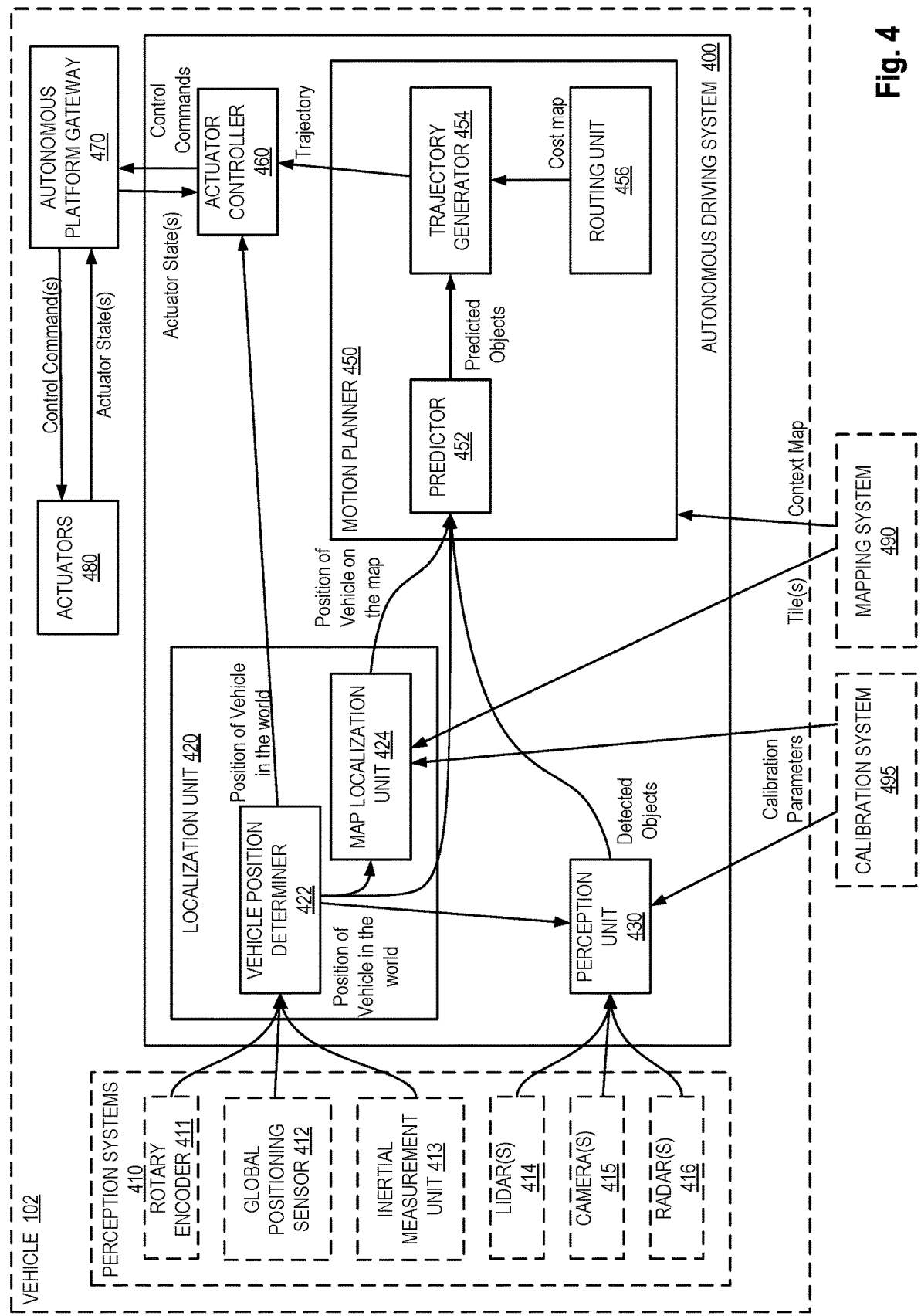
FIG. 4 illustrates a block diagram of an exemplary autonomous driving system, according to some embodiments.

FIG. 4 illustrates a block diagram of an exemplary ADS 400 that can be used for managing interactions between an autonomous vehicle and one or more objects, in some embodiments. While in some embodiments, the ADS 400 is implemented as described with reference to FIG. 4, in other embodiments, different implementations can be considered without departing from the scope of the embodiments described herein.

The ADS 400 is operative to perform autonomous driving tasks for the vehicle. In some embodiments, the ADS 400 of the vehicle 102 is operative to manage interactions of the vehicle 102 with one or more objects, e.g., the objects 104A-E. The operations of the ADS 400 are described in further details with reference to FIGS. 2A-B and FIGS. 3A-E. The ADS 400 is coupled with perception systems 410, a calibration system 495, and a mapping system 490. In some embodiments, one or more of the mapping system 490 and the calibration system 495 can be implemented in the same electronic device as the ADS 400. In other embodiments, one or more the mapping system 490 and the calibration system 495 can be implemented in a different electronic device that is located remotely from the electronic device on which the ADS 400 is implemented. In some embodiments, the calibration system 495 and the mapping system 490 can be optional.

The perception systems 410 include one or more sensors that can be used to record sensor measurements. The perception systems 410 may include a rotary encoder 411, a global positioning sensor 412, an inertial measurement unit 413, one or more lidars 414, one or more cameras 415, and one or more radars 416. In some embodiments, fewer or more sensors can be included as part of the perception systems 410. For example, the perception systems 410 may include only cameras 415 without including radars 416 and/or lidars 414. In another example, the perception systems 410 includes a combination of cameras and lidars, a combination of cameras and radars, or a combination of lidars and radars. Other combinations can be considered.

The ADS 400 includes a localization unit 420 that is coupled with the rotary encoder 411, the GPS sensor 412, and the IMU 413. These sensors transmit inputs to the localization unit 420, which are used to determine the position of the vehicle in the world (through the vehicle position determiner 422) and/or on a map (the map localization unit 424). The ADS 400 further includes a perception unit 430. The perception unit 430 is operative to receive sensor data from the cameras, lidars, radars and/or other sensors, the position of the vehicle in the world and on the map and detect objects that are located in the vicinity of the vehicle 102. The ADS 400 includes a motion planner 450 that is operative to determine a trajectory for a given interval of time. The motion planner includes a predictor 452, a trajectory generator 454, and a routing unit 456. The motion planner 450 determines a trajectory that is fed to the actuator controller 460. The actuator controller 460 transmits control commands and receives actuator states from an autonomous platform gateway 470. The autonomous platform gateway 470 acts as an interface between the actuators of the vehicle 102 and the ADS 400.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices, allowing them to communicate via wire through plugging in a cable to a physical port connected to a NIC. One or more parts of an embodiment of the invention may be implemented using different combinations of software, firmware, and/or hardware.

Figure 5:
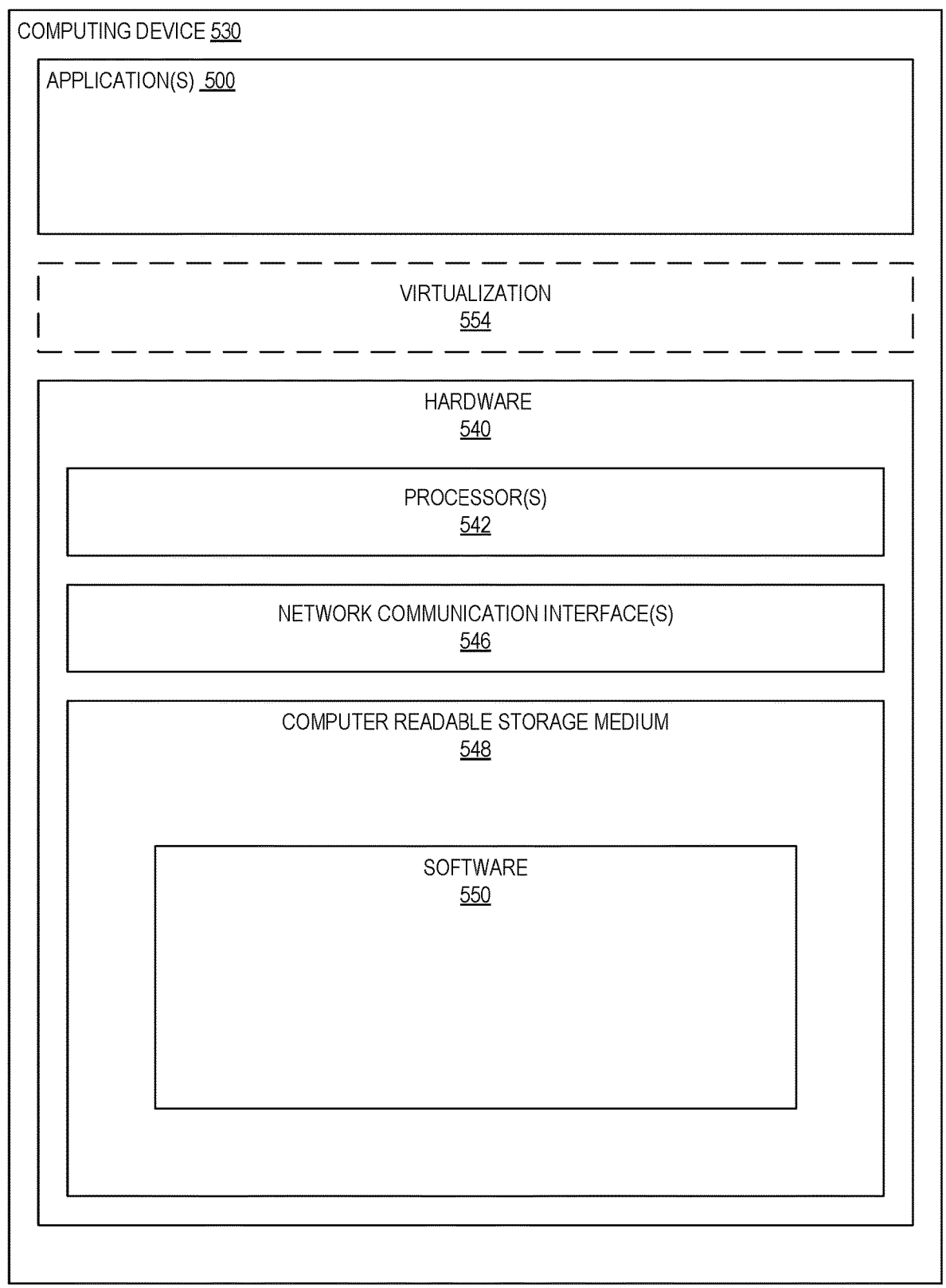
FIG. 5 illustrates a block diagram of an exemplary computing device that can be used for performing calibration of multiple lidar devices with non-overlapping fields of view, according to some embodiments.

FIG. 5 illustrates a block diagram of an exemplary computing device that can be used for managing interactions between an autonomous vehicle and one or more objects, according to some embodiments.

The computing device 530 includes hardware 540 comprising a set of one or more processor(s) 542 (which are often COTS processors) and physical network communications interfaces (NIs) 546, as well as non-transitory machine-readable storage media 548 having stored therein software 550. During operation, the processor(s) 542 execute the software 550 to instantiate one or more sets of one or more applications 500. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications is run on top of a guest operating system within an instance called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization, if implemented, are collectively referred to as software instance(s). Each set of applications, corresponding virtualization construct if implemented, and that part of the hardware 540 that executes them (be it hardware dedicated to that execution and/or time slices of hardware temporally shared), forms a separate computing element(s) that is operative to perform the operations the ADS 400.

It will be appreciated that additional components, not shown, may also be part of the computing devices 530, and, in certain embodiments, fewer components than that shown in FIG. 5 may also be used in a computing device 530.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the Figs. show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

While the flow diagrams in the Figs. show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A method of managing interactions of an autonomous vehicle with one or more objects, the method comprising:
   detecting, based on sensor measurements, an object that is located in the vicinity of the autonomous vehicle;
   assigning to the object an interaction label that describes how the autonomous vehicle is to interact with the object, wherein the interaction label is one of a yield label, a no-yield label, a stay-behind label, a stay in-front label, and an irrelevant label;
   generating, based at least in part on the interaction label, a cost function for the object; and
   determining, based on the cost function, a trajectory for the autonomous vehicle for an interval of time.

2. The method of claim 1, wherein the assigning to the object the interaction label is performed based on a space label, a trajectory label, and a race result label for the object, wherein the space label is indicative of a relationship between a route of the autonomous vehicle and a topology of a road on which the object is located, the trajectory label is indicative of a relationship between a predicted trajectory of the object and a desired future spatial occupancy of the autonomous vehicle, and the race result label is indicative of a result of a race between the autonomous vehicle and the object.

3. The method of claim 2 further comprising:
   assigning, based on the topology of the road on which the object is located and the route of the autonomous vehicle, the space label for the object;
   assigning, based on the predicted trajectory of the object and the desired future spatial occupancy of the autonomous vehicle, the trajectory label for the object; and
   assigning, based on a motion vector of the object and a motion vector of the autonomous vehicle, the race result label.

4. The method of claim 3, wherein the assigning, based on the topology of the road on which the object is located and the route of the autonomous vehicle, the space label for the object includes:
   assigning a first space label for the object when a first lane on which the autonomous vehicle is located coincides with a second lane on which the object is located;
   assigning a second space label when the first lane and the second lane are disjoint; and
   assigning a third space label when the first lane and the second lane merge.

5. The method of claim 3, wherein the assigning, based on the predicted trajectory of the object and the desired future spatial occupancy of the autonomous vehicle, the trajectory label for the object includes:
   assigning a first trajectory label when the predicted trajectory of the object intersect with the desired future spatial occupancy of the autonomous vehicle; and
   assigning a second trajectory label when the predicted trajectory of the object does not intersect with the desired future spatial occupancy of the autonomous vehicle.

6. The method of claim 3, wherein the assigning, based on a motion vector of the object and a motion vector of the autonomous vehicle, the race result label includes:
   assigning a first race result label when the autonomous vehicle is expected to reach a region that the autonomous vehicle and the object are expected to simultaneously occupy in the future before the object;
   assigning a second race result label when the object is expected to reach the region before the autonomous vehicle; and
   assigning a third race result when the object and the autonomous vehicle are not expected to occupy any region simultaneously.

7. The method of claim 1, wherein the generating, based at least in part on the interaction label, the cost function for the object is further performed based on a speed of the autonomous vehicle and a speed of the object.

8. The method of claim 1, wherein the generating, based at least in part on the interaction label, the cost function for the object includes:
determining a shape of the cost function based at least in part on the interaction label.

9. The method of claim 1, wherein the sensor measurements are received from one or more cameras, one or more lidar devices, and/or one or more radar devices that are mounted on the autonomous vehicle.

10. The method of claim 1 further comprising:
determining, using the trajectory, control commands for controlling the motion of the autonomous vehicle during the interval of time.

11. A non-transitory machine-readable storage medium that provides instructions that, if executed by a processor an autonomous vehicle, will cause said processor to perform operations comprising:
detecting, based on sensor measurements, an object that is located in the vicinity of the autonomous vehicle;
assigning to the object an interaction label that describes how the autonomous vehicle is to interact with the object, wherein the interaction label is one of a yield label, a no-yield label, a stay-behind label, a stay in-front label, and an irrelevant label;
generating, based at least in part on the interaction label, a cost function for the object; and
determining, based on the cost function, a trajectory for the autonomous vehicle for an interval of time.

12. The non-transitory machine-readable storage medium of claim 11, wherein the assigning to the object the interaction label is performed based on a space label, a trajectory label, and a race result label for the object, wherein the space label is indicative of a relationship between a route of the autonomous vehicle and a topology of a road on which the object is located, the trajectory label is indicative of a relationship between a predicted trajectory of the object and a desired future spatial occupancy of the autonomous vehicle, and the race result label is indicative of a result of a race between the autonomous vehicle and the object.

13. The non-transitory machine-readable storage medium of claim 12, wherein the operations further comprise:
assigning to the object, based on the topology of the road on which the object is located and the route of the autonomous vehicle, the space label;
assigning to the object, based on the predicted trajectory of the object and the desired future spatial occupancy of the autonomous vehicle, the trajectory label; and
assigning to the object, based on a motion vector of the object and a motion vector of the autonomous vehicle, the race result label.

14. The non-transitory machine-readable storage medium of claim 13, wherein the assigning to the object, based on the topology of the road on which the object is located and the route of the autonomous vehicle, the space label includes:
assigning a first space label for the object when a first lane on which the autonomous vehicle is located coincides with a second lane on which the object is located;
assigning a second space label when the first lane and the second lane are disjoint; and
assigning a third space label when the first lane and the second lane merge.

15. The non-transitory machine-readable storage medium of claim 13, wherein the assigning to the object, based on the predicted trajectory of the object and the desired future spatial occupancy of the autonomous vehicle, the trajectory label:

assigning a first trajectory label when the predicted trajectory of the object intersect with the desired future spatial occupancy of the autonomous vehicle; and
assigning a second trajectory label when the predicted trajectory of the object does not intersect with the desired future spatial occupancy of the autonomous vehicle.

16. The non-transitory machine-readable storage medium of claim 13, wherein the assigning to the object, based on a motion vector of the object and a motion vector of the autonomous vehicle, the race result label includes:
assigning a first race result label when the autonomous vehicle is expected to reach a region that the autonomous vehicle and the object are expected to simultaneously occupy in the future before the object;
assigning a second race result label when the object is expected to reach the region before the autonomous vehicle; and
assigning a third race result when the object and the autonomous vehicle are not expected to occupy any region simultaneously.

17. The non-transitory machine-readable storage medium of claim 11, wherein the generating, based at least in part on the interaction label, the cost function for the object is further performed based on a speed of the autonomous vehicle and a speed of the object.

18. The non-transitory machine-readable storage medium of claim 11, wherein the generating, based at least in part on the interaction label, the cost function for the object includes:
determining a shape of the cost function based at least in part on the interaction label.

19. The non-transitory machine-readable storage medium of claim 11, wherein the sensor measurements are received from one or more cameras, one or more lidar devices, and/or one or more radar devices that are mounted on the autonomous vehicle.

20. The non-transitory machine-readable storage medium of claim 11 further comprising:
determining, using the trajectory, control commands for controlling the motion of the autonomous vehicle during the interval of time.

21. An autonomous vehicle comprising:
a non-transitory machine-readable storage medium that provides instructions that, if executed by a processor will cause the autonomous vehicle to perform operations comprising,
detecting, based on sensor measurements, an object that is located in the vicinity of the autonomous vehicle;
assigning to the object an interaction label that describes how the autonomous vehicle is to interact with the object, wherein the interaction label is one of a yield label, a no-yield label, a stay-behind label, a stay in-front label, and an irrelevant label;
generating, based at least in part on the interaction label, a cost function for the object; and
determining, based on the cost function, a trajectory for the autonomous vehicle for an interval of time.

22. The autonomous vehicle of claim 21, wherein the assigning to the object the interaction label is performed based on a space label, a trajectory label, and a race result label for the object, wherein the space label is indicative of a relationship between a route of the autonomous vehicle and a topology of a road on which the object is located, the trajectory label is indicative of a relationship between a predicted trajectory of the object and a desired future spatial occupancy of the autonomous vehicle, and the race result label is indicative of a result of a race between the autonomous vehicle and the object.

23. The autonomous vehicle of claim 22, wherein the operations further comprise:
assigning, based on the topology of the road on which the object is located and the route of the autonomous vehicle, the space label for the object;
assigning, based on the predicted trajectory of the object and the desired future spatial occupancy of the autonomous vehicle, the trajectory label for the object; and
assigning, based on a motion vector of the object and a motion vector of the autonomous vehicle, the race result label.

24. The autonomous vehicle of claim 23, wherein the assigning, based on the topology of the road on which the object is located and the route of the autonomous vehicle, the space label for the object includes:
assigning a first space label for the object when a first lane on which the autonomous vehicle is located coincides with a second lane on which the object is located;
assigning a second space label when the first lane and the second lane are disjoint; and
assigning a third space label when the first lane and the second lane merge.

25. The autonomous vehicle of claim 23, wherein the assigning, based on the predicted trajectory of the object and the desired future spatial occupancy of the autonomous vehicle, the trajectory label for the object includes:
assigning a first trajectory label when the predicted trajectory of the object intersect with the desired future spatial occupancy of the autonomous vehicle; and
assigning a second trajectory label when the predicted trajectory of the object does not intersect with the desired future spatial occupancy of the autonomous vehicle.

26. The autonomous vehicle of claim 23, wherein the assigning, based on a motion vector of the object and a motion vector of the autonomous vehicle, the race result label includes:
assigning a first race result label when the autonomous vehicle is expected to reach a region that the autonomous vehicle and the object are expected to simultaneously occupy in the future before the object;
assigning a second race result label when the object is expected to reach the region before the autonomous vehicle; and
assigning a third race result when the object and the autonomous vehicle are not expected to occupy any region simultaneously.

27. The autonomous vehicle of claim 21, wherein the generating, based at least in part on the interaction label, the cost function for the object is further performed based on a speed of the autonomous vehicle and a speed of the object.

28. The autonomous vehicle of claim 21, wherein the generating, based at least in part on the interaction label, the cost function for the object includes:
determining a shape of the cost function based at least in part on the interaction label.

29. The autonomous vehicle of claim 21, wherein the sensor measurements are received from one or more cameras, one or more lidar devices, and/or one or more radar devices that are mounted on the autonomous vehicle.

30. The autonomous vehicle of claim 21, wherein the operations further comprise:
determining, using the trajectory, control commands for controlling the motion of the autonomous vehicle during the interval of time.

* * * * *